(12) United States Patent
Ramasubramonian et al.

(10) Patent No.: US 12,283,073 B2
(45) Date of Patent: Apr. 22, 2025

(54) INTER PREDICTION CODING FOR GEOMETRY POINT CLOUD COMPRESSION

(71) Applicant: QUALCOMM Incorporated, San Diego, CA (US)

(72) Inventors: Adarsh Krishnan Ramasubramonian, Irvine, CA (US); Bappaditya Ray, San Diego, CA (US); Luong Pham Van, San Diego, CA (US); Geert Van der Auwera, Del Mar, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 404 days.

(21) Appl. No.: 17/646,217

(22) Filed: Dec. 28, 2021

(65) Prior Publication Data

US 2022/0207780 A1 Jun. 30, 2022

Related U.S. Application Data

(60) Provisional application No. 63/218,170, filed on Jul. 2, 2021, provisional application No. 63/179,892, filed (Continued)

(51) Int. Cl.
*G06T 9/00* (2006.01)
*H04N 19/105* (2014.01)
(Continued)

(52) U.S. Cl.
CPC ........... *G06T 9/001* (2013.01); *H04N 19/105* (2014.11); *H04N 19/107* (2014.11);
(Continued)

(58) Field of Classification Search
CPC ....... G06T 9/001; G06T 9/004; H04N 19/105; H04N 19/107; H04N 19/172; H04N 19/1883; H04N 19/597; H04N 19/70
See application file for complete search history.

(56) References Cited

U.S. PATENT DOCUMENTS

| 2019/0087979 | A1 | 3/2019 | Mammou et al. | |
|---|---|---|---|---|
| 2023/0239491 | A1* | 7/2023 | Nishi | H04N 19/597 |
| | | | | 375/240.16 |

FOREIGN PATENT DOCUMENTS

| CN | 112509107 A | 3/2021 |
|---|---|---|
| WO | WO-2020197086 A1 * | 10/2020 |

OTHER PUBLICATIONS

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

(Continued)

*Primary Examiner* — Michael J Vanchy, Jr.
(74) *Attorney, Agent, or Firm* — Shumaker & Sieffert, P. A.

(57) ABSTRACT

An example of processing a point cloud includes responsive to determining to predict a current point in the point cloud using predictive geometry coding, selecting, from a set of prediction modes, a prediction mode for the current point, wherein the set of prediction modes includes at least an intra prediction mode and an inter prediction mode; and responsive to selecting the inter prediction mode for the current point, predicting the current point of the point cloud using inter prediction.

50 Claims, 12 Drawing Sheets

Related U.S. Application Data on Apr. 26, 2021, provisional application No. 63/177,186, filed on Apr. 20, 2021, provisional application No. 63/170,907, filed on Apr. 5, 2021, provisional application No. 63/134,492, filed on Jan. 6, 2021, provisional application No. 63/131,716, filed on Dec. 29, 2020.

(51) Int. Cl.
    *H04N 19/107*    (2014.01)
    *H04N 19/169*    (2014.01)
    *H04N 19/172*    (2014.01)
    *H04N 19/597*    (2014.01)
    *H04N 19/70*    (2014.01)

(52) U.S. Cl.
    CPC ....... *H04N 19/172* (2014.11); *H04N 19/1883* (2014.11); *H04N 19/597* (2014.11); *H04N 19/70* (2014.11)

(56) References Cited

OTHER PUBLICATIONS

International Search Report and Written Opinion—PCT/US2021/065483—ISA/EPO—Apr. 7, 2022, 15 pp.
3DG: "G-PCC Codec Description v8", 131. MPEG Meeting, Jun. 29, 2020-Jul. 3, 2020, Online, (Motion Picture Expert Group or ISO/IEC JTC1/SC29/WG11), Coding of Moving Pictures and Audio, Convenorship: JISC (Japan), No. N19525, Oct. 2, 2020, 142 Pages, Oct. 10, 2020, XP030292244.
3DG: "G-PCC Future Enhancements", International Organisation for Standardisation Organisation Internationale De Normalisation, ISO/IEC JTC 1/SC 29/WG 11 Coding of Moving Pictures and Audio, ISO/IEC JTC 1/SC 29/WG 11, N19328, Alpbach, AT, Apr. 2020, 6 Pages.
"G-PCC Codec Description", 132. MPEG Meeting, Oct. 12, 2020-Oct. 16, 2020, Online, (Motion Picture Expert Group or ISO/IEC JTC1/SC29/WG11), No. n19620, Dec. 31, 2020, 148 Pages, XP030291393.
Information Technology—MPEG-I (Coded Representation of Immersive Media)—Part 9: Geometry-based Point Cloud Compression, ISO/IEC 23090-9:2020(E), ISO/IEC JTC 1/SC 29/WG 11, Jan. 13, 2020-Jan. 17, 2020, Brussels, (Motion Picture Expert Group or ISO/IEC JTC1/SC29/WG11), No. n19088 , Apr. 20, 2020, XP030287968, 127 pages.
"Inter-Prediction Exploration Model (Inter-EM) v3.0", 135. MPEG Meeting, Jul. 12, 2021-Jul. 16, 2021, Online (Motion Picture Expert Group or ISO/IEC JTC1/SC29/WG11), No. N00189, Serial No. 20763, Sep. 27, 2021, XP030297751, 20 Pages, Paragraph "Inter-prediction coding", p. 28.
Ramasubramonian A.K., et al., "[G-PCC][EE13.2-related][New proposal] Additional Results on Inter Prediction for Predictive Geometry", International Organisation for Standardisation Organisation Internationale DE Normalisation ISO/IEC JTC 1/SC 29/WG 7 Coding of Moving Pictures and Audio, ISO/IEC JTC 1/SC 29/WG 7 m56841-v2Online—Apr. 2021, pp. 1-3.
Ramasubramonian A.K., et al., "[G-PCC][New proposal] Inter Prediction with Predictive Geometry Coding", International Organisation for Standardisation Organisation Internationale De Normalisation ISO/IEC JTC 1/SC 29/WG 7 Coding of Moving Pictures and Audio, ISO/IEC JTC 1/SC 29/WG 7 m56117 Online—Jan. 2021, pp. 1-3.
Ramasubramonian (Qualcomm) A.K., et al., "[G-PCC] [New proposal] Improvements to Inter Prediction Using Predictive Geometry Coding", 135. MPEG Meeting, Jul. 12, 2021-Jul. 16, 2021, Online (Motion Picture Expert Group Or ISO/IEC JTC1/SC29/WG11), No. M57299, Jul. 28, 2021, 4 pages, XP030296818, the whole document.
Ramasubramonian(Qualcomm) A.K., et al., "[G-PCC] EE13.2 report on InterPrediction, Test 2", 134. MPEG Meeting, Apr. 26, 2021-Apr. 30, 2021, online, (Motion Picture Expert Group or ISO/IEC JTC1/SC29/WG11), No. m56839, 6 Pages, Apr. 25, 2021, XP030295475.
"Technologies Under Consideration in G-PCC", 135. MPEG Meeting, Jul. 12, 2021-Jul. 16, 2021, Online, (Motion Picture Expert Group or ISO/IEC JTC1/SC29/WG11), No. N20648, Aug. 19, 2021, XP030297555, 44 pages, Paragraph 5 "Inter Prediction for Predictive Geometry Coding", p. 29.
ISO/IEC: "Technologies Under Consideration in G-PCC", n20648, 135. MPEG Meeting: Jul. 12, 2021-Jul. 16, 2021, Online, Motion Picture Expert Group OR ISO/IEC JTC1/SC29/WG11), Aug. 19, 2021, 44 Pages.
WG7: "Inter-Prediction Exploration Model Inter-EM) V3.0", N20763, 135. MPEG Meeting; Jul. 12, 2021-Jul. 16, 2021, Online, Motion Picture Expert Group or ISO/IECJTC1/SC29/WG11), 20 Pages, Sep. 27, 2021.

* cited by examiner

600

⊖ Root vertex

○ Branch vertex with 1 child

⊕ Branch vertex with 2 children

◐ Branch vertex with 3 children

Ⓘ Leaf vertex

INTER PREDICTION CODING FOR GEOMETRY POINT CLOUD COMPRESSION

This application is related to U.S. Provisional Application No. 63/131,716, filed Dec. 29, 2020, U.S. Provisional Application No. 63/134,492, filed Jan. 6, 2021, U.S. Provisional Application No. 63/170,907, filed Apr. 5, 2021, U.S. Provisional Application No. 63/177,186, filed Apr. 20, 2021, U.S. Provisional Application No. 63/179,892, filed Apr. 26, 2021, and U.S. Provisional Application No. 63/218,170, filed Jul. 2, 2021, the entire contents of each of which are hereby incorporated by reference.

TECHNICAL FIELD

This disclosure relates to point cloud encoding and decoding.

SUMMARY

Figure 1:
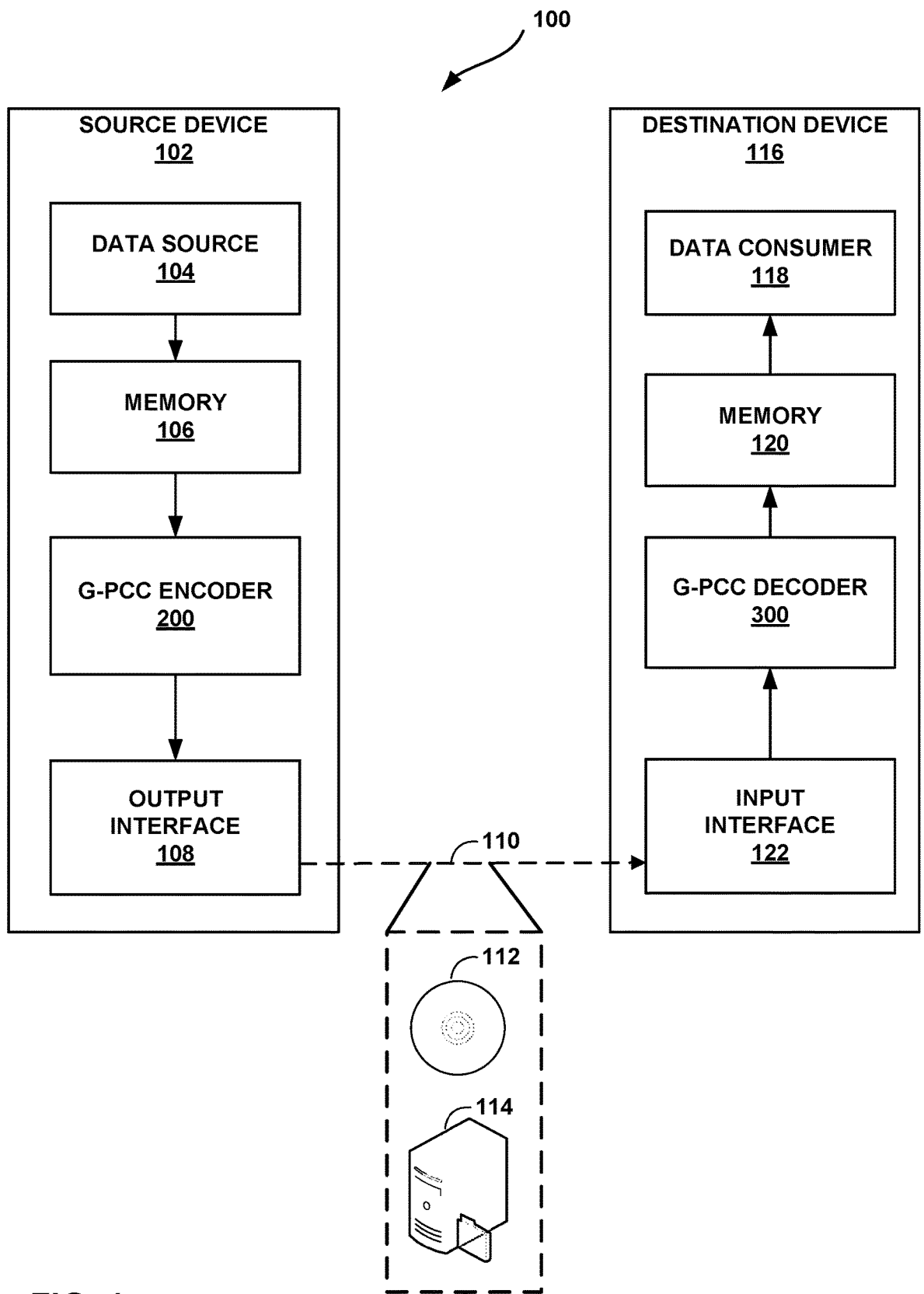
FIG. 1 is a block diagram illustrating an example encoding and decoding system that may perform the techniques of this disclosure.

In general, this disclosure describes techniques for coding nodes of a point cloud using inter prediction, such as for the Geometry Point Cloud Compression (G-PCC) standard currently being developed. However, the example techniques are not limited to the G-PCC standard. In some examples of G-PCC, coordinates of position of nodes (also referred to as points) of a point cloud may converted into a (r, $\phi$, i) domain in which a position of a node is represented by three parameters, a radius r, an azimuth $\phi$, and a laser index i (e.g., a laser identifier). When using an angular mode for predictive geometry coding in G-PCC, a G-PCC coder may perform prediction in the (r, $\phi$, i) domain. For instance, to code a particular node of a particular frame of a point cloud, the G-PCC coder may determine a predicted radius r, azimuth $\phi$, and laser index i of the particular node based on another node of the particular frame and add the predicted radius r, azimuth $\phi$, and laser index i of the node to residual data (e.g., a residual radius r, a residual azimuth $\phi$, and a residual laser index i) to determine a reconstructed radius r, azimuth $\phi$, and laser index i of the particular node. As coding the residual data may account for most of the coding overhead, the coding efficiency (e.g., an amount of bits used to code a point) may be a factor of how close the predicted radius r, azimuth $\phi$, and laser index i of the particular node is to the reconstructed radius r, azimuth $\phi$, and laser index i of the particular node. As such, it may be desirable to enable generation of predicted parameters for a node as close as possible to the actual parameters of the node.

In accordance with one or more techniques of this disclosure, a G-PCC coder may predict a current point of a current frame of a point cloud using inter prediction. For instance, to predict the current point using inter prediction, the G-PCC coder may identify a reference point in a different frame than the current frame and predict one or more parameters (e.g., a radius r, an azimuth $\phi$, and a laser index i) of the current point based on one or more parameters of the reference point. Where the parameters of the reference point are closer to the parameters of the current point than the parent or other available points in the current frame, predicting the current point using inter prediction may reduce the size of residual data. In this way, the techniques of this disclosure may enable a G-PCC coder to improve coding efficiency.

In one example, a method of processing a point cloud includes, responsive to determining to predict a current point in the point cloud using predictive geometry coding, selecting, from a set of prediction modes, a prediction mode for the current point, wherein the set of prediction modes includes at least an intra prediction mode and an inter prediction mode; and responsive to selecting the inter prediction mode for the current point, predicting the current point of the point cloud using inter prediction.

In another example, a device for processing a point cloud comprises: a memory configured to store at least a portion of the point cloud; and one or more processors implemented in circuitry and configured to: responsive to determining to predict a current point in the point cloud using predictive geometry coding, select, from a set of prediction modes, a prediction mode for the current point, wherein the set of prediction modes includes at least an intra prediction mode and an inter prediction mode; and responsive to selecting the inter prediction mode for the current point, predict, the current point of the point cloud using inter prediction.

In another example, computer-readable storage medium stores instructions that, when executed by one or more processors, cause the one or more processors to: responsive to determining to predict a current point in the point cloud using predictive geometry coding, select, from a set of prediction modes, a prediction mode for the current point, wherein the set of prediction modes includes at least an intra prediction mode and an inter prediction mode; and responsive to selecting the inter prediction mode for the current point, predict the current point of the point cloud using inter prediction.

The details of one or more examples are set forth in the accompanying drawings and the description below. Other features, objects, and advantages will be apparent from the description, drawings, and claims.

DETAILED DESCRIPTION

When using an angular mode for predictive geometry coding in G-PCC, a G-PCC coder may perform prediction in the (r, φ, i) domain. For instance, to code a particular node of a particular frame of a point cloud, the G-PCC coder may determine a predicted radius r, azimuth φ, and laser index i of the particular node based on another node of the particular frame and add the predicted radius r, azimuth φ, and laser index i of the node to residual data (e.g., a residual radius r, a residual azimuth φ, and a residual laser index i) to determine a reconstructed radius r, azimuth φ, and laser index i of the particular node. As coding the residual data may account for most of the coding overhead, the coding efficiency (e.g., an amount of bits used to code a point) may be a factor of how close the predicted radius r, azimuth φ, and laser index i of the particular node is to the reconstructed radius r, azimuth φ, and laser index i of the particular node. As such, it may be desirable to enable generation of predicted parameters for a node as close as possible to the actual parameters of the node.

In accordance with one or more techniques of this disclosure, a G-PCC coder may predict a current point of a current frame of a point cloud using inter prediction. For instance, to predict the current point using inter prediction, the G-PCC coder may identify a reference point in a different frame than the current frame and predict one or more parameters (e.g., a radius r, an azimuth φ, and a laser index i) of the current point based on one or more parameters of the reference point. Where the parameters of the reference point are closer to the parameters of the current point than the parent or other available points in the current frame, predicting the current point using inter prediction may reduce the size of residual data. In this way, the techniques of this disclosure may enable a G-PCC coder to improve coding efficiency.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure related to predictive geometry coding. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to predictive geometry coding. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, point cloud data may be computer-generated from scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11) is studying the potential need for standardization of point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values (for each point associated with the 3D geometry). G-PCC addresses the compression of point clouds in both Category 1 (static point clouds) and Category 3 (dynamically acquired point clouds). A draft of the G-PCC standard is available in G-PCC DIS, ISO/IEC JTC1/SC29/WG11 w19328, Brussels, Belgium, January 2020, and a description of the codec is available in G-PCC Codec Description v8, ISO/IEC JTC1/SC29/WG11 w19525, Brussels, Belgium, January 2020.

A point cloud contains a set of points in a 3D space, and may have attributes associated with the point. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

Figure 2:
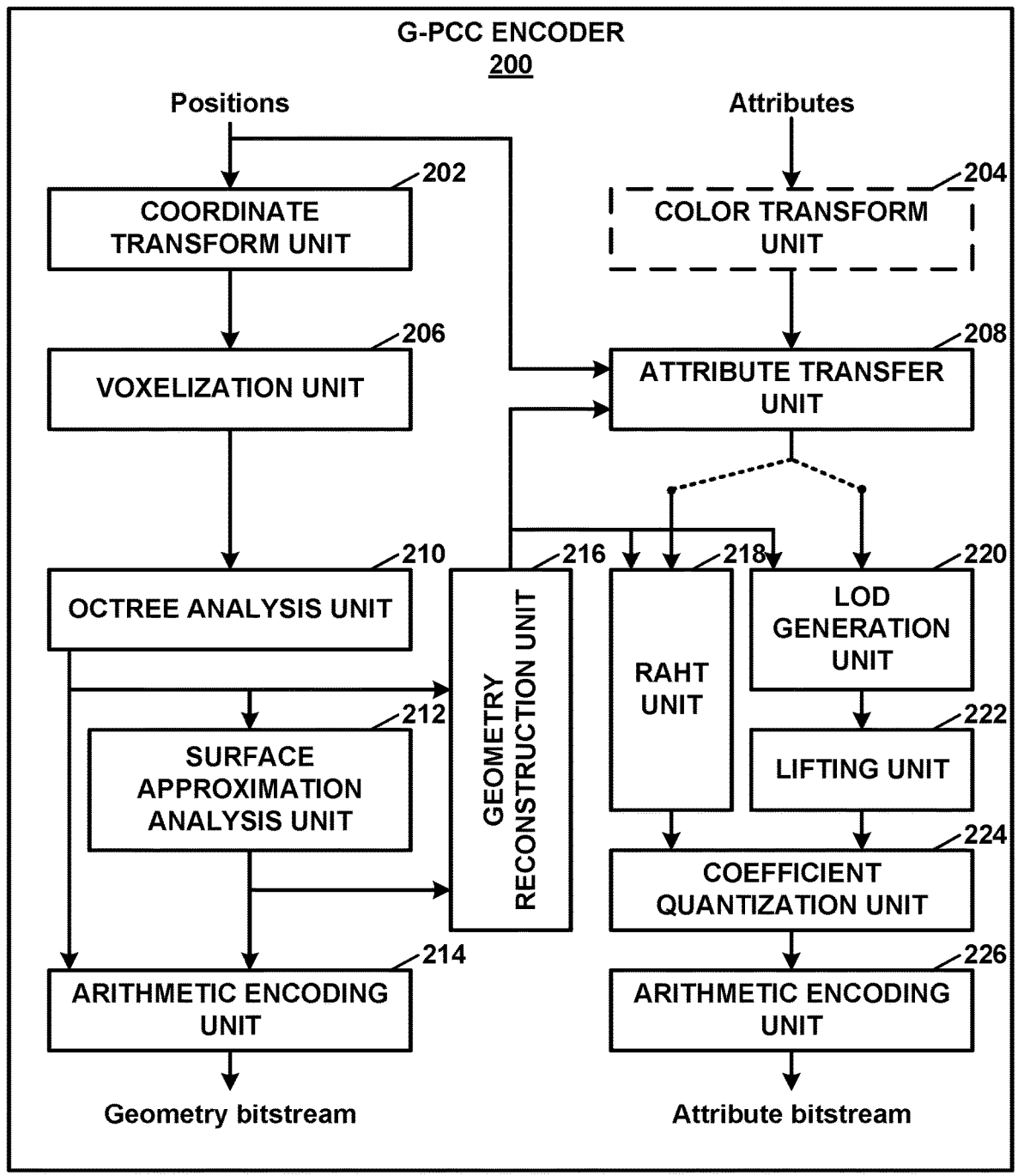
FIG. 2 is a block diagram illustrating an example Geometry Point Cloud Compression (G-PCC) encoder, in accordance with one or more aspects of this disclosure.
Figure 3:
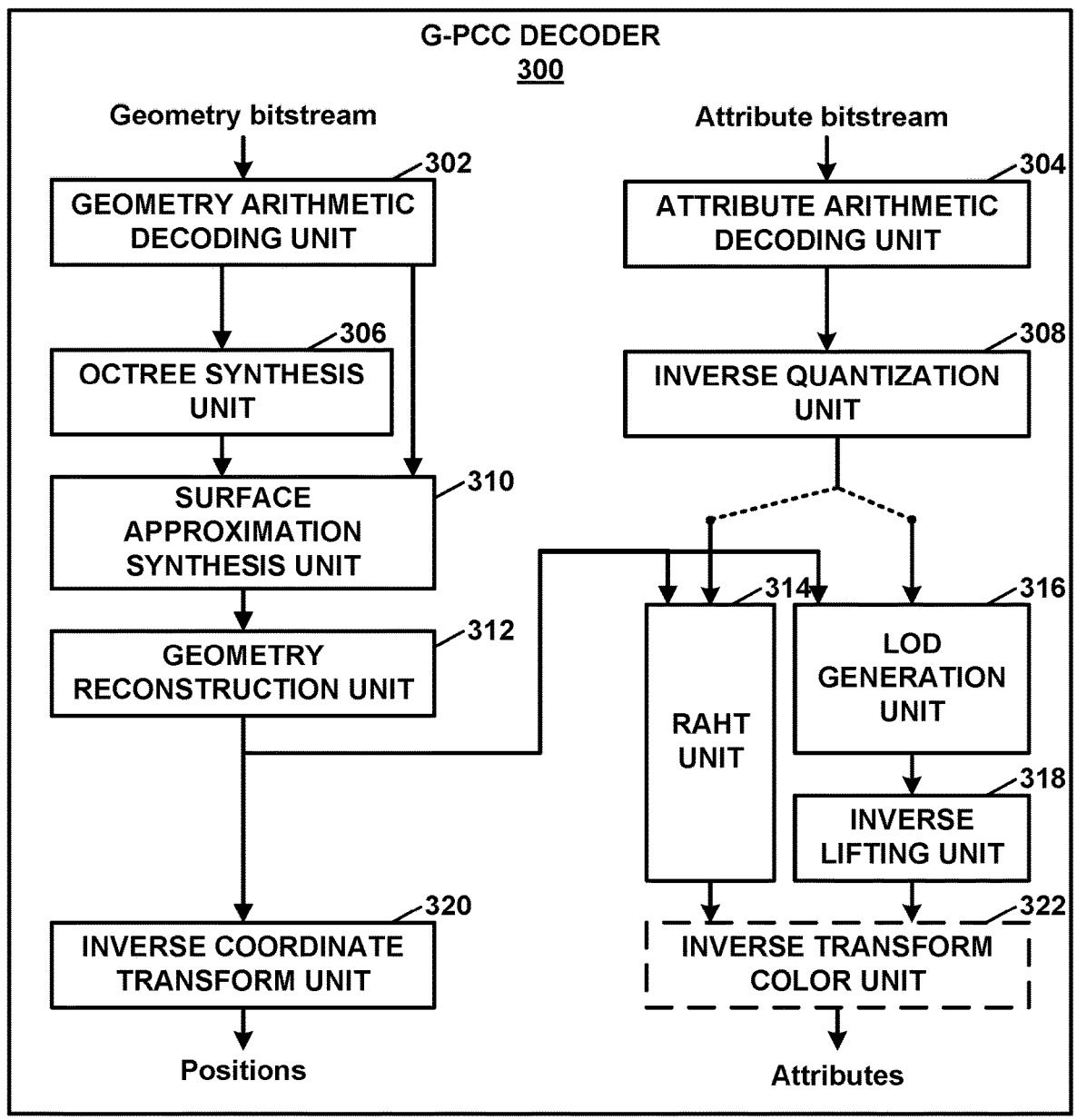
FIG. 3 is a block diagram illustrating an example G-PCC decoder, in accordance with one or more aspects of this disclosure.

FIG. 2 provides an overview of G-PCC encoder 200. FIG. 3 provides an overview of G-PCC decoder 300. The modules shown are logical, and do not necessarily correspond one-to-one to implemented code in the reference implementation of G-PCC codec, i.e., TMC13 test model software studied by ISO/IEC MPEG (JTC 1/SC 29/WG 11).

In both G-PCC encoder 200 and G-PCC decoder 300, point cloud positions are coded first. Attribute coding depends on the decoded geometry. In FIG. 2 and FIG. 3, modules 212, 218, 310, and 314 are options typically used for Category 1 data. Modules 220, 222, 316, and 318 are options typically used for Category 3 data. All the other modules are common between Categories 1 and 3.

For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

Figure 4:
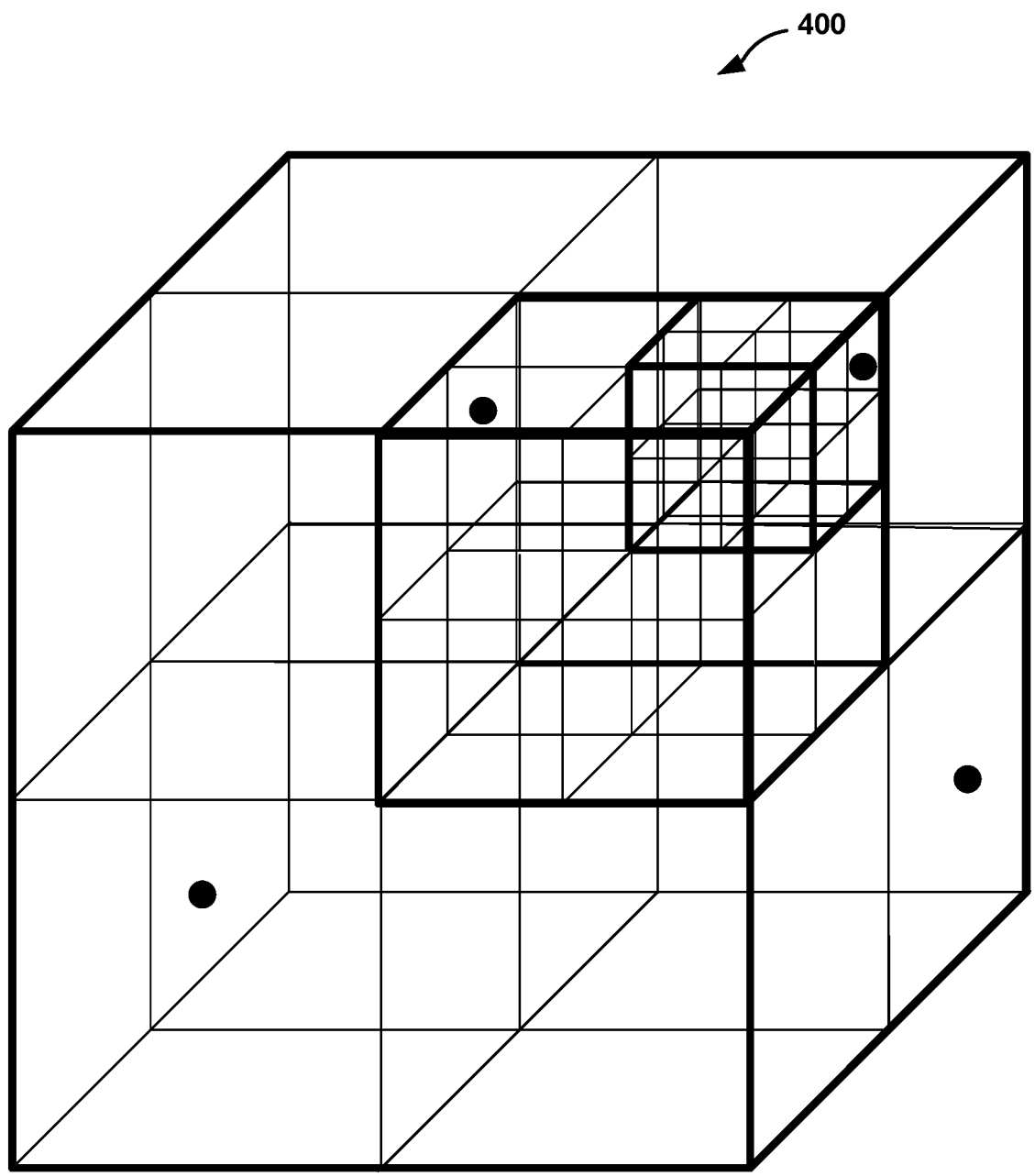
FIG. 4 is a conceptual diagram illustrating octree split for geometry coding, in accordance with one or more aspects of this disclosure.

FIG. 4 is a conceptual diagram illustrating an example octree split for geometry coding according to the techniques of this disclosure. In the example shown in FIG. 4, octree 400, may be split into a series of nodes. For example, each node may be a cubic node. At each node of an octree, G-PCC encoder 200 may signal an occupancy of a node by a point of the point cloud to G-PCC decoder 300, when the occupancy is not inferred by G-PCC decoder 300, for one or more of the node's child nodes, which may include up to eight nodes. Multiple neighborhoods are specified including (a) nodes that share a face with a current octree node, (b) nodes that share a face, edge, or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. With a direct mode, positions of points in the point cloud may be coded directly without any compression. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and Lifting Transform are typically used for Category 1 data, while Predicting Transform is typically used for Category 3 data. However, either method may be used for any data, and, just like with the geometry codecs in G-PCC, the attribute coding method used to code the point cloud is specified in the bitstream.

The coding of the attributes may be conducted in a level-of-detail (LOD), where with each level of detail a finer representation of the point cloud attribute may be obtained.

Each level of detail may be specified based on a distance metric from the neighboring nodes or based on a sampling distance.

At G-PCC encoder 200, the residuals obtained as the output of the coding methods for the attributes are quantized (e.g., by one of arithmetic encoding units 214 and/or 226). The quantized residuals may be coded using context adaptive arithmetic coding.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226.

As shown in the example of FIG. 2, G-PCC encoder 200 may receive a set of positions and a set of attributes. The positions may include coordinates of points in a point cloud. The attributes may include information about points in the point cloud, such as colors associated with points in the point cloud.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in a geometry bitstream.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud. As shown in FIG. 2, attribute transfer unit 208 may transfer the attributes to one or both of RAHT unit 218 and LOD generation unit 220.

Furthermore, RAHT unit 218 may apply RAHT coding to the attributes of the reconstructed points. Alternatively or additionally, LOD generation unit 220 and lifting unit 222 may apply LOD processing and lifting, respectively, to the attributes of the reconstructed points. RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in an attribute bitstream.

In the example of FIG. 3, G-PCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LoD generation unit 316, an inverse lifting unit 318, an inverse transform coordinate unit 320, and an inverse transform color unit 322.

G-PCC decoder 300 may obtain a geometry bitstream and an attribute bitstream. Geometry arithmetic decoding unit 302 of decoder 300 may apply arithmetic decoding (e.g., Context-Adaptive Binary Arithmetic Coding (CABAC) or other type of arithmetic decoding) to syntax elements in the geometry bitstream. Similarly, attribute arithmetic decoding unit 304 may apply arithmetic decoding to syntax elements in the attribute bitstream.

Octree synthesis unit 306 may synthesize an octree based on syntax elements parsed from the geometry bitstream. In instances where surface approximation is used in the geometry bitstream, surface approximation synthesis unit 310 may determine a surface model based on syntax elements parsed from the geometry bitstream and based on the octree.

Furthermore, geometry reconstruction unit 312 may perform a reconstruction to determine coordinates of points in a point cloud. Inverse transform coordinate unit 320 may apply an inverse transform to the reconstructed coordinates to convert the reconstructed coordinates (positions) of the points in the point cloud from a transform domain back into an initial domain.

Additionally, in the example of FIG. 3, inverse quantization unit 308 may inverse quantize attribute values. The attribute values may be based on syntax elements obtained from the attribute bitstream (e.g., including syntax elements decoded by attribute arithmetic decoding unit 304). As shown in FIG. 3, inverse quantization unit 308 may transfer the attribute values to one or both of RAHT unit 314 and LOD generation unit 316.

Depending on how the attribute values are encoded, RAHT unit 314 may perform RAHT coding to determine, based on the inverse quantized attribute values, color values for points of the point cloud. Alternatively, LOD generation unit 316 and inverse lifting unit 318 may determine color values for points of the point cloud using a level of detail-based technique.

Furthermore, in the example of FIG. 3, inverse transform color unit 322 may apply an inverse color transform to the color values. The inverse color transform may be an inverse of a color transform applied by color transform unit 204 of encoder 200. For example, color transform unit 204 may transform color information from an RGB color space to a YCbCr color space. Accordingly, inverse color transform unit 322 may transform color information from the YCbCr color space to the RGB color space.

The various units of FIG. 2 and FIG. 3 are illustrated to assist with understanding the operations performed by encoder 200 and decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Figure 6:
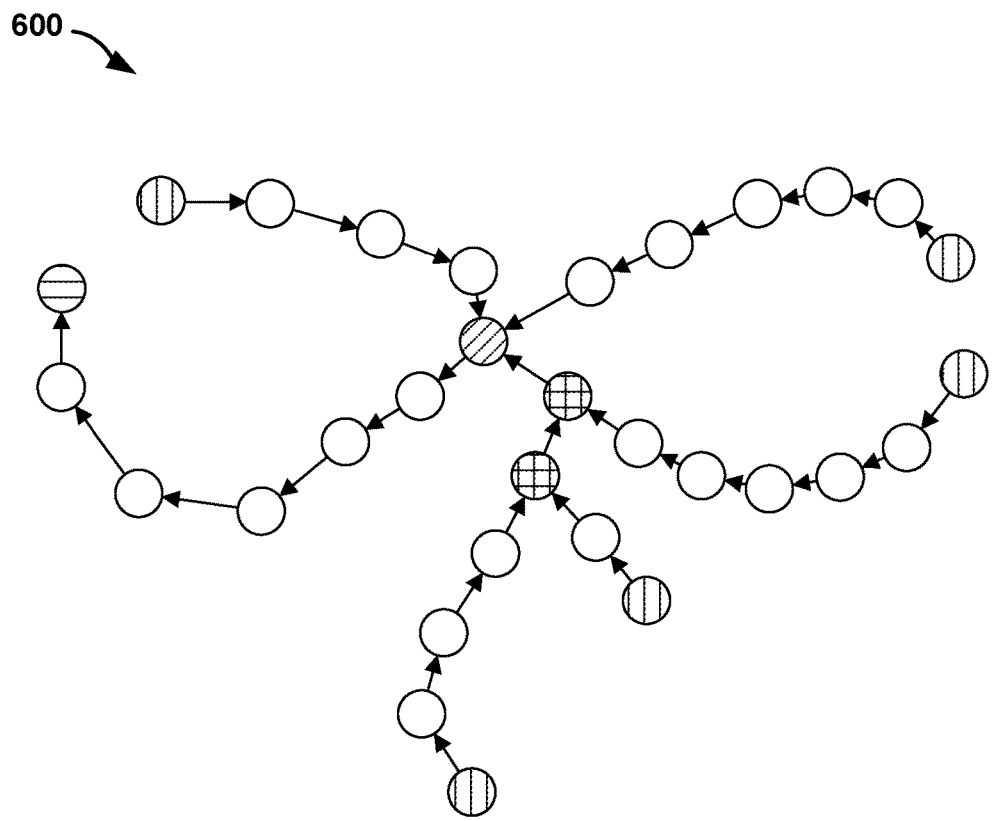
FIG. 6 is a conceptual diagram of a prediction tree for predictive geometry coding, in accordance with one or more aspects of this disclosure.

Predictive geometry coding was introduced as an alternative to the octree geometry coding, where the nodes are arranged in a tree structure (which defines the prediction structure), and various prediction strategies are used to predict the coordinates of each node in the tree with respect to its predictors. FIG. 6 is a conceptual diagram illustrating an example of a prediction tree 600, a directed graph where the arrow points to the prediction direction. The horizontally shaded node is the root vertex and has no predictors; the grid shaded nodes have two children; the diagonally shaded node has 3 children; the non-shaded nodes have one children and the vertically shaded nodes are leaf nodes and these have no children. Every node has only one parent node.

Four prediction strategies may be specified for each node based on its parent (p0), grand-parent (p1) and great-grand-parent (p2). The prediction strategies include, no prediction, delta prediction (p0), linear prediction (2*p0−p1), and parallelogram prediction (2*p0+p1−p2).

The encoder (e.g., G-PCC encoder 200) may employ any algorithm to generate the prediction tree; the algorithm used may be determined based on the application/use case and several strategies may be used. The encoder may encode, for each node, the residual coordinate values in the bitstream starting from the root node in a depth-first manner. Predictive geometry coding may be particularly useful for Category 3 (LIDAR-acquired) point cloud data e.g., for low-latency applications.

Figure 5A:
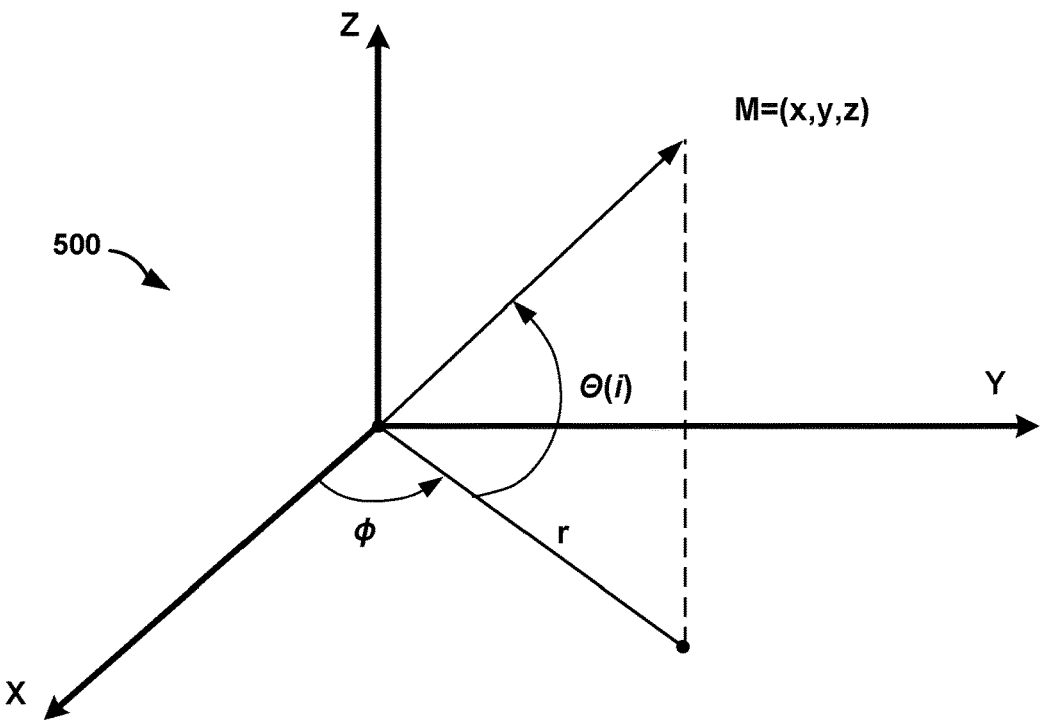
FIGS. 5A and 5B are conceptual diagrams of a spinning LIDAR acquisition model, in accordance with one or more aspects of this disclosure.
Figure 5B:
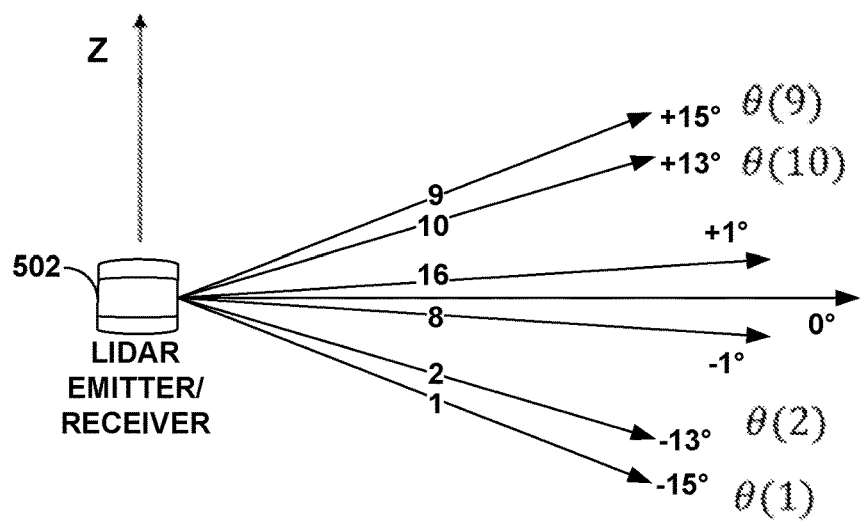

Angular mode may be used in predictive geometry coding, where the characteristics of LIDAR sensors may be utilized in coding the prediction tree more efficiently. The coordinates of the positions are converted to the (r, ϕ, i) (radius, azimuth, and laser index) and a prediction is performed in this domain (the residuals are coded in r, ϕ, i domain). Due to the errors in rounding, coding in r, ϕ, i is not lossless and hence a second set of residuals may be coded which correspond to the Cartesian coordinates. A description of the encoding and decoding strategies used for angular mode for predictive geometry coding is reproduced below. The description is based on FIGS. 5A and 5B, which are conceptual diagrams of a spinning LIDAR acquisition model.

The techniques of this disclosure may be applicable to at least point clouds acquired using a spinning Lidar model. Here, the lidar 502 has N lasers (e.g., N=16, 32, 64) spinning around the Z axis according to an azimuth angle ϕ (see FIGS. 5A and 5B). Each laser may have different elevation $\theta(i)_{i=1 \ldots N}$ and height $\zeta(i)_{i=1 \ldots N}$. The laser i hits a point M, with cartesian integer coordinates (x, y, z), defined according to coordinate system 500 described in FIG. 5A.

The position of M is modelled with three parameters (r, ϕ, i), which may be computed as follows:

$$r = \sqrt{x^2 + y^2}$$

$$\phi = \text{atan2}(y, x)$$

$$i = \arg\min_{j=1\ldots N}\{z + \varsigma(j) - r \times \tan(\theta(j))\},$$

The coding process may use the quantized version of (r, ϕ, i), denoted (r̃, ϕ̃, i), where the three integers r̃, ϕ̃ and i may be computed as follows:

$$\tilde{r} = \text{floor}\left(\frac{\sqrt{x^2+y^2}}{q_r} + o_r\right) = hypot(x, y)$$

$$\tilde{\phi} = \text{sign}(\text{atan2}(y, x)) \times \text{floor}\left(\frac{|\text{atan2}(y, x)|}{q_\phi} + o_\phi\right)$$

$$i = \arg\min_{j=1\ldots N}\{z + \varsigma(j) - r \times \tan(\theta(j))\}$$

where
($q_r$, $o_r$) and ($q_\phi$, $o_\phi$) are quantization parameters controlling the precision of ϕ̃ and r̃, respectively.
sign(t) is the function that returns 1 if t is positive and (−1) otherwise.
|t| is the absolute value of t.

To avoid reconstruction mismatches due to the use of floating-point operations, the values of $\varsigma(i)_{i=1 \ldots N}$ and $\tan(\theta(i))_{i=1 \ldots N}$ may be pre-computed and quantized as follows:

$$z(i) = \text{sign}(\varsigma(i)) \times \text{floor}\left(\frac{|\varsigma(i)|}{q_\varsigma} + 0_\varsigma\right)$$

$$\tilde{t}(i) = \text{sign}\left(\varsigma(\tan(\theta(j)))\right) \times \text{floor}\left(\frac{|\tan(\theta(j))|}{q_\theta} + o_\theta\right)$$

where
($q_\varsigma$, $o_\varsigma$) and ($q_\theta$, $o_\theta$) are quantization parameters controlling the precision of $\tilde{\varsigma}$ and $\tilde{\theta}$, respectively.

The reconstructed cartesian coordinates are obtained as follows:
$\hat{x}$=round(r̃×$q_r$×app_cos(ϕ̃×$q_\phi$))
$\hat{y}$=round(r̃×$q_r$×app_sin(ϕ̃×$q_\phi$))
$\hat{z}$=round(r̃×$q_r$×t̃(i)×$q_\theta$−z̃(i)×$q_\varsigma$,
where app_cos(.) and app_sin(.) are approximation of cos(.) and sin(.). The calculations could be using a fixed-point representation, a look-up table and linear interpolation.

In some examples, ($\hat{x}$, $\hat{y}$, $\hat{z}$) may be different from (x, y, z) due to various reasons, including:
quantization
approximations
model imprecision
model parameters imprecisions In some examples, the reconstruction residuals ($r_x$, $r_y$, $r_z$) can be defined as follows:
$r_x$=x−$\hat{x}$
$r_y$=y−$\hat{y}$
$r_z$=z−$\hat{z}$ In this method, the encoder (e.g., G-PCC encoder 200) may proceed as follows:
Encode the model parameters t̃(i) and z̃(i) and the quantization parameters $q_r$, $q_\varsigma$, $q_\theta$ and $q_\phi$
Apply the geometry predictive scheme described in G-PCC DIS to the representation (r̃, ϕ̃, i)
A new predictor leveraging the characteristics of lidar could be introduced. For instance, the rotation speed of the lidar scanner around the z-axis is usually constant. Therefore, the G-PCC decoder may predict the current $\tilde{\phi}(j)$ as follows:

$$\tilde{\phi}(j) = \tilde{\phi}(j-1) + n(j) \times \delta_\phi(k)$$

Where
- $(\delta_\phi(k))_{k=1...K}$ is a set of potential speeds the encoder could choose from. The index k could be explicitly written to the bitstream or could be inferred from the context based on a deterministic strategy applied by both the encoder and the decoder, and
- n(j) is the number of skipped points, which could be explicitly written to the bitstream or could be inferred from the context based on a deterministic strategy applied by both the encoder and the decoder.

Encode with each node the reconstruction residuals ($r_x$, $r_y$, $r_z$)

The decoder (e.g., G-PCC decoder 300) may proceed as follows:

Decode the model parameters $\tilde{t}(i)$ and $\tilde{z}(i)$ and the quantization parameters $q_r$, $q_z$, $q_\theta$ and $q_\phi$ Decode the ($\tilde{r}$, $\tilde{\phi}$, i) parameters associated with the nodes according to the geometry predictive scheme described in G-PCC Draft International Standard (DIS)

Compute the reconstructed coordinates ($\hat{x}$, $\hat{y}$, $\hat{z}$) as described above Decode the residuals ($r_x$, $r_y$, $r_z$)
  As discussed in the next section, lossy compression could be supported by quantizing the reconstruction residuals ($r_x$, $r_y$, $r_z$)

Compute the original coordinates (x, y, z) as follows
  $x = r_x + \hat{x}$
  $y = r_y + \hat{y}$
  $z = r_z + \hat{z}$ Lossy compression could be achieved by applying quantization to the reconstruction residuals ($r_x$, $r_y$, $r_z$) or by dropping points.

The quantized reconstruction residuals are computed as follows:

$$\tilde{r}_x = \text{sign}(r_x) \times \text{floor}\left(\frac{|r_x|}{q_x} + o_x\right)$$

$$\tilde{r}_y = \text{sign}(r_y) \times \text{floor}\left(\frac{|r_y|}{q_x} + o_y\right)$$

$$\tilde{r}_z = \text{sign}(r_z) \times \text{floor}\left(\frac{|r_z|}{q_x} + o_z\right)$$

Where ($q_x$, $o_x$), ($q_y$, $o_y$) and ($q_z$, $o_z$) are quantization parameters controlling the precision of $\tilde{r}_x$, $\tilde{r}_y$ and $\tilde{r}_z$, respectively.

In some examples, G-PCC encoder 200 and/or G-PCC decoder 300 may use Trellis quantization to further improve the RD (rate-distortion) performance results. The quantization parameters may change at sequence/frame/slice/block level to achieve region adaptive quality and for rate control purposes.

The aforementioned techniques may present one or more disadvantages. Predictive geometry coding takes advantage of the mechanism of spinning LIDARs to predict the position of one point from another in the point cloud. However, this mechanism is restricted to points within the same point cloud frame. No information from points in a previously coded frame (i.e., a reference frame) may be used for the prediction.

In accordance with one or more techniques of this disclosure, a G-PCC coder (e.g., G-PCC encoder 200 and/or G-PCC decoder 300) may perform point cloud compression using inter-prediction. By using inter-prediction, the G-PCC coder may use redundancy of points across frames to provide additional bit rate savings. Examples in the various aspects of this disclosure may be used individually or in any combination.

Although the discussion is predominantly on the polar coordinate system, methods disclosed in this application may also apply to other coordinate system such as Cartesian, spherical, or any custom coordinate system that may be used to represent/code the point cloud positions and attributes.

The G-PCC coder may determine whether to code a point using inter-prediction or intra prediction. For instance, the G-PCC encoder may perform an analysis to determine it whether would be beneficial (e.g., in terms of bitrate or other conditions) to code a particular point using inter or intra prediction. In some examples, the G-PCC coder may perform this determination in one of the following ways:

1. Using a first set of conditions at the encoder, and using the first set of conditions at the decoder.

2. Using a first set of conditions at the encoder, signaling a syntax element that indicates the inter-prediction mode, and decoder determining the mode based on the signaled syntax element.

The first set of conditions may be derived using one or more characteristics of the point such as cartesian position, angular coordinates (radius, azimuth, elevation), prediction mode of neighboring nodes, etc. Some examples of conditions included in the first set of conditions are as follows:

1. The point belongs to a frame that is not an intra coded frame, or that does not correspond to a random access point.

2. The azimuth of the current point is different from the azimuth of the previously decoded point(s) of the current frame, or the delta azimuth between the current and previous point is non-zero. In some examples, an approximation of the delta azimuth, or a quantized version of the delta azimuth, may be used to determine the inter-prediction mode of the current node.

3: The point belongs to a slice that is of a particular type (i.e., P slice or B slice indicating inter-prediction may be applied).

4: A flag is signaled to indicate whether inter prediction is enabled for a particular frame. This flag may be signaled in a syntax element associated with the frame (e.g., slice/slice header, frame header, etc.) or a parameter set to which the frame refers. For instance, an inter_prediction_enabled_flag may be signaled in the geometry parameter set (GPS) to specify whether inter prediction is enabled for point cloud frames/slices referring to the GPS. When inter_prediction_enabled_flag indicates that inter prediction is not enabled, inter prediction indication for points in the point cloud may not be signaled.

In some alternatives, the inter-prediction mode for a point may be determined based on the residual of the azimuth, or the phi multiplier associated with the point.

In some alternatives, the inter prediction (or one or more inter prediction modes) may be enabled only when the angular mode is enabled (i.e., the inter prediction may be disabled where the angular mode is not enabled).

The G-PCC coder may chose a reference frame. In some examples, the G-PCC coder may use a previously decoded frame (or in some cases the preceding frame in decoding order) as the reference frame. In other examples, an indication of a frame number (using LSB values or delta frame number values) may be used to specify a reference frame. More generically, two or more frames may be specified as reference frames and a point may be coded with interprediction from any of the reference frames (indication of the reference frame associated with the point may be signaled or derived).

In another example, prediction may be performed from two or more frames (e.g., bi-prediction). As such, a G-PCC coder may predict a point of a current frame based on a reference point in a first reference frame and a reference point in a second reference frame.

The G-PCC coder may utilize a plurality of inter-prediction modes. When a point is inter-predicted, there may be one or more ways to predict the point from a reference frame. Different mode values may be used to specify each type of prediction (e.g., a G-PCC coder may signal a syntax element that indicates an inter prediction mode used for a current point). As one example inter prediction mode, a point may be predicted from a zero-motion candidate from a reference frame (e.g., a reference point in the reference frame may be a zero-motion candidate). As another example inter prediction mode, a point may be predicted from a global motion candidate from a reference frame. As another example inter prediction mode, a point may be predicted from a candidate point from a reference frame, and other parameters (e.g., motion vector, etc.) may be used to specify the candidate point.

Some details about example different types of inter-prediction are provided below.

The G-PCC coder may utilize a partial inter-prediction mode. In one example, inter-prediction may only apply to predict a subset of the characteristics of a point in a point cloud. One of more of the characteristics for which intra prediction does not apply may be coded using intra prediction or by other techniques. Some examples of partial inter-prediction mode follow:

1. When a point is indicated to be inter-predicted, the radius of the point may be predicted from a reference point (or a reference frame) when angular mode is enabled; the azimuth and laser ID (or elevation) may be derived based on intra prediction or other techniques.

2. If a point is indicated to be inter-predicted, both the radius and the azimuth of the point are predicted from a reference point (or a reference frame) when angular mode is enabled; the G-PCC coder may derive laser ID (or elevation) based on intra prediction or other techniques.

The G-PCC coder may perform signaling of the inter-prediction mode. In some examples, the inter-prediction mode associated with a point may be signaled in the bitstream. This may be signaled as a flag, or as a mode value. Some example inter-prediction mode signaling techniques follow:

1. An inter-pred-flag equal to 0 may indicate that the point is predicted using intra-prediction, and inter-pred-flag equal to 1 may indicate that the point is predicted using inter-prediction. In some examples, based on the indication that the point is predicted using inter-prediction, a mode value may be signaled to specify the method to perform the inter-prediction of the point.

2. When a point is predicted with inter-prediction, a mode value may be signaled where a mode value of 0 specifies that the zero-motion candidate is used for prediction, and a mode value of 1 specifies that a global motion candidate is used for prediction.

In this disclosure, inter-prediction mode may be used interchangeably with an indication of whether a point is coded with inter-prediction and with the particular inter-prediction technique used.

Certain conditions may affect how the G-PCC coder signals the inter-prediction mode. In some cases, inter-prediction mode may be signaled only when a second set of conditions apply. The second set of conditions may be derived using one or more characteristics of the point such as cartesian position, angular coordinates (radius, azimuth, elevation), prediction mode of neighboring nodes, etc. Some examples of conditions included in the second set of conditions are as follows:

1. The point belongs to a frame that is not an intra coded frame, or that does not correspond to a random access point.

2. The azimuth of the current point is different from the azimuth of the previously decoded point(s), or the delta azimuth between the current and previous point is non-zero. In some examples, an approximation of the delta azimuth, or a quantized version of the delta azimuth, may be used to determine the inter-prediction mode of the current node.

3. The delta azimuth between the current and the previous point is more than a threshold; the value of the threshold may be fixed or signaled in the bitstream, or derived based on syntax elements signaled in the bitstream.

More generally, the second set of conditions may include one or more criteria, including but not limited to, a delta azimuth value, a delta radius value, a delta laserID value, a delta elevation value. This delta value of a characteristic may be indicated by a corresponding residual value that is signaled in the bitstream for a point. The second set of conditions may also include delta coordinate values in the Cartesian domain (delta x, delta y, delta z).

When inter-prediction mode is not signaled for a particular point, the inter-prediction mode may be inferred to be a fixed value for the point.

4. When inter-prediction mode is not signaled for a point, the value is assumed to be 0 (or the value that specifies intra prediction).

Signaling optimizations. In some cases, inter-prediction mode may not be signaled for all points, and instead the inter-prediction mode may be derived from a syntax element signaled in the bitstream.

1. An inter-prediction mode may be signaled for a prediction tree, and the inter-prediction mode may apply to all the points in the prediction tree.

2. An inter-prediction mode may be signaled in a geometry slice, and the inter-prediction mode may apply to all the points in the slice.

3. An inter-prediction mode may be signaled for a prediction block (specified as a fixed number of points, or a signaled number of points, etc.), and the inter-prediction mode may apply to all the points in the prediction block.

In some examples, the inter-prediction mode may only be signaled to some nodes that are specified by the tree depth.

4. An inter-prediction mode may only be signaled for the root node of a prediction tree.

In one example, when inter prediction is applied for some characteristics of the point (e.g., radius), and intra prediction is applied to other characteristics of the points (e.g., azimuth, laserID) only a subset of the intra prediction modes may be allowed (e.g., only Mode 0 of intra prediction may be allowed for azimuth, laser ID). In some examples, if only one intra prediction mode is allowed, then mode value is not signaled and inferred at the decoder. In some examples, if a subset (two or more) of intra prediction modes is allowed, a more optimized coding of the mode syntax element may be applied (e.g., fewer bits may be sufficient to code the index to the subset of the modes).

For each point and corresponding to each prediction mode, the G-PCC coder may derive a prediction value of one or more characteristics of the current point based on the position of one or more points in the reference frame. An example prediction process follows:

1a. When a zero-motion candidate is chosen, a prediction candidate may be chosen as the point with the closest azimuth and laser ID corresponding to a particular value of the azimuth and laser ID (e.g., reconstructed azimuth value and laserID of the current point); the value of radius of the prediction candidate is chosen as the prediction value of radius of the current node.

1b. When a zero-motion candidate is chosen, a prediction candidate may be chosen as the point with the closest azimuth and laser ID corresponding to a particular value of azimuth and laser ID (e.g., a reconstructed azimuth value and laserID of a previously decoded and reconstructed point); the values of radius, azimuth and laserID of the prediction candidate are chosen as the prediction value of radius, azimuth and laserID of the current node.

2a. When a global motion candidate is chosen, a prediction candidate may be chosen as the point with the closest azimuth and laser ID corresponding to a particular value of azimuth and laser ID after the application of global motion compensation to the prediction candidate; the value of radius of the prediction candidate is chosen as the prediction value of radius of the current node.

2b. When a global motion candidate is chosen, a prediction candidate after the application of global motion compensation to the prediction candidate may be chosen as the point with the closest azimuth and laser ID corresponding to a particular value of azimuth and laser ID (e.g., reconstructed azimuth value and laserID of a previously decoded and reconstructed point); the values of radius, azimuth and laserID of the prediction candidate are chosen as the prediction value of radius, azimuth and laserID of the current node.

3a. When a generic candidate is chosen, a prediction candidate may be chosen as the point with the closest azimuth and laser ID corresponding to a particular value of azimuth and laser ID after the application of motion vector (associated with the current point) to the prediction candidate; the value of radius of the prediction candidate is chosen as the prediction value of radius of the current node.

3b. When a generic candidate is chosen, a prediction candidate after the application of motion vector to the prediction candidate may be chosen as the point with the closest azimuth and laser ID corresponding to a particular value of azimuth and laser ID (e.g., reconstructed azimuth value and laserID of a previously decoded and reconstructed point); the values of radius, azimuth and laserID of the prediction candidate are chosen as the prediction value of radius, azimuth and laserID of the current node.

In some examples, a motion vector may be used to derive a point that is used to derive a radius, an azimuth and laser ID (or elevation) of the current point, or a prediction of these values. In some examples, the motion vector may be used to derive the prediction of x, y, z coordinates, or a prediction of these values.

In some examples, more than one point in the reference frame may be used to derive the prediction value. The number of points can be signaled in slice header or in the GPS. In some examples, an index to the two or more points in the reference frame may be signaled to specify the particular point to be used for inter prediction.

4. When a zero-motion candidate is chosen, two prediction candidates are chosen as the two points with the two closest azimuth and laser ID corresponding to a particular value of azimuth and laser ID; the average value of radii of the two prediction candidates is chosen as the prediction value of the radius of the current node.

5. When two or more prediction candidates are chosen as candidates for inter prediction (e.g., based on the closeness of laser ID and/or azimuth), the prediction candidate may be chosen by signaling an index to a list comprising the two or more prediction candidates. In some alternatives, a weighted average (weights calculated based on the difference in the laser ID values of the current point and predictor and/or a difference between the azimuth of the current point and the predictor) may also be used as a prediction candidate.

The G-PCC coder may perform preparation of the reference frame. In some examples, the reference frame may be motion compensated before inter prediction. For example, one or more points of a reference frame may be associated with a motion (e.g., global motion), and the prediction for a subsequent frame may be obtained by compensating the position of the points with the associated motion. This motion may be estimated or obtained from external information (such as the GPS information). The "reference frame" used for inter-prediction may thus be a "compensated reference frame." In other words, the reference frame may be a motion compensated reference frame.

In some examples, one or more points in the compensated reference frame may be considered as a zero-motion candidate for the current frame. In some examples, the points in the reference frame for which motion compensation is applied may belong to a particular feature in the point cloud (e.g., an object), or it may be labelled (e.g., ground, non-ground) by some estimation algorithms. The global motion parameters (e.g., rotation, translation) may be signaled in the bitstream.

In some examples, in addition to global motion parameters, additional adjustment values may be signaled for one or more of the following: x, y, z, radius, azimuth, laserID. For example, when the predictor frame is prepared by applying the motion compensation (e.g., using motion parameters), one or more additional adjustments values of x, y, z may be applied in the Cartesian domain; one or additional adjustments values of radius, azimuth, laserID may be applied in the spherical domain.

In some examples, the adjustment values may be specified for the entire sequence (representing a "global" adjustment); these values may also be incorporated in the global motion parameters.

In some examples, the adjustment values may be specified for a group of frames (representing a "group" adjustment); these values may also be incorporated in the global motion parameters.

In some examples, the adjustment values may be specified for a frame (representing a "frame" adjustment); these values may also be incorporated in the global motion parameters.

In some examples, the adjustment values may be specified for different regions of the points cloud (representing a "local" adjustment); these values may also be incorporated in the global motion parameters or signaled as modifications to global motion applicable to the frame.

One or more of global, frame and local adjustments may be signaled; when more than one of these parameters is present, the corresponding adjustments may be applied in succession or together (e.g., a global, frame and local x adjustment $xg$, $xf$, $xl$, respectively may be applied as $xg+xf+xl$ for points belonging to the region). In other examples, all the adjustments at one level (e.g., global) may be applied before applying the adjustments at a different level (e.g., frame)

The motion vector associated with inter-prediction mode of a point may be signaled in the bitstream. In some cases, multiple points may share the same motion vector and may be signaled in the slice or in a parameter set (e.g., GPS, or parameter set specifically used for motion parameters). In some cases, the motion vector associated with a particular point can be predicted from spatial or temporal inter-predicted neighboring points, and only the difference between the actual and the predicted motion vector can be signaled.

The G-PCC coder may perform context selection. For instance, the G-PCC coder may determine the context to be used for predictive geometry parameters/syntax elements based on one or more syntax elements signaled in the bitstream, or variables derived thereof. The use of additional contexts may improve the compression efficiency of the codec.

In some examples, the G-PCC coder may utilize a first parameter associated with a point to determine the context for other syntax elements associated with the point. For instance, the context of one or more syntax elements associated with phi multiplier (e.g., ptn_phi_mult_abs_gt0_flag, ptn_phi_mult_sign_flag, ptn_phi_mult_abs_gt1_flag, ptn_phi_mult_abs_minus2, ptn_phi_mult_abs_minus9) may be selected based on an inter flag.

In one example, the inter flag indicates whether a first set of contexts is selected in case inter prediction was used or whether a second set of contexts is selected in case intra prediction was used. This may apply to the coding of the phi multiplier, primary and secondary residuals in case of predictive geometry with angular mode enabled (spherical position coding: azimuth, radius, elevation or laserID).

If the context for a syntax element is dependent on a first set of conditions, one context may be chosen when the first set of conditions is true and the first parameter associated with the point takes a first value, and a second context may be chosen when the first set of conditions is true, and the first parameter associated with the point takes a second value that is different from the first value.

Different choices of first parameter are described below; each choice may present a different trade-off between compression efficiency and storage (more contexts may require more storage associated with context states):

1. In one example, the first parameter may be an inter flag associated with the point.
2. In another example, the first parameter may be a prediction mode (e.g., prediction mode used in predictive geometry) associated with the point.
3. In a further example, the first parameter may be a tuple consisting of inter flag and prediction mode associated with a point e.g., (interFlag, predMode)
4. When more than one inter prediction candidate is present (e.g., zero motion candidate, global motion candidate, etc.), let interPredMode represent the various inter prediction candidates (e.g., 0 for intra, 1 for zero motion candidate, 2 for global motion candidate, etc.). The first parameter may be interPredMode.

In some examples, the G-PCC coder may use different conditions/parameters for different type of frames. For example, for frames that are intra coded (that do not have reference to other frames in the sequence for prediction), a second parameter may be chosen to determine the context as described in the disclosure, and other frames (e.g., inter-coded frames), a third parameter may be chosen to determine the context as described in this disclosure. The second and third parameters may be different (e.g., for intra frames, the prediction mode may be chosen as the second parameter and for inter frames, the tuple of prediction mode and inter flag may be chosen as the third parameter). The G-PCC coder may extend similar context selection to one or more syntax elements/components (primary residual, secondary residuals, etc.).

Figure 7:
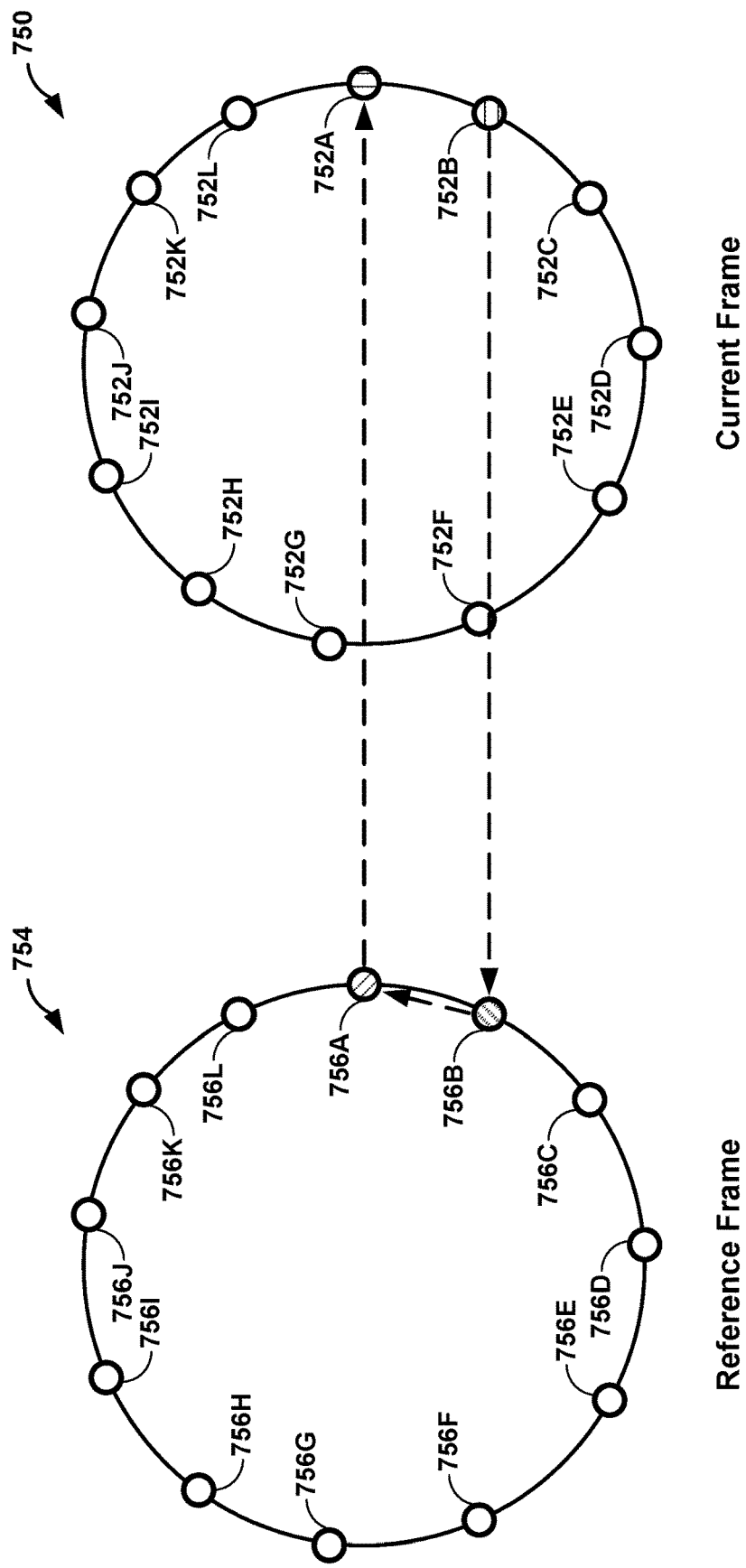
FIG. 7 is a conceptual diagram illustrating an example inter prediction process for predicting points of a point cloud, in accordance with one or more aspects of this disclosure.

FIG. 7 is a conceptual diagram illustrating an example inter prediction process for predicting points of a point cloud, in accordance with one or more aspects of this disclosure. As shown in FIG. 7, current frame 750 may include a plurality of points 752A-752L (collectively, "points 752") and reference frame 754 may include a plurality of points 756A-756L (collectively, "points 756"). Reference frame 754 may be a frame that is encoded and/or reconstructed prior to current frame 750 being decoded and/or reconstructed (e.g., reference frame 754 may precede current frame 750 in a coding order). A G-PCC coder may utilize intra prediction to predict one or more of points 752 of current frame 750 based on one or more of points 756 of reference frame 754. For instance, a G-PCC decoder (or a reconstruction loop of a G-PCC encoder) may predict one or more parameters (e.g., (r, φ, i) of current point 752A of points 752 based on one or more of points 756.

To perform intra prediction to predict a current point in a current frame, the G-PCC coder may determine a reference point in a reference frame that is different than the current frame and predict one or more parameters of the current point based on the reference point. For instance, to predict current point 752A, the G-PCC coder may determine reference point 756A and predict one or more parameters of current point 752A based on one or more parameters of reference points 756A. The determined reference point may be referred to as an identified reference point.

The G-PCC coder may determine the reference point using any suitable technique. As one example, the G-PCC coder may determine, in the current frame, a pivot point that precedes the current point in a coding order; and determine, based on one or more parameters of the pivot point, the reference point. For instance, where the coding order is counter-clockwise, the G-PCC coder may determine that point 752B is the previous point of current point 752A (e.g., the point that immediately precedes the current point in the coding order) (i.e., determine that point 752B is the pivot point), and determine a reference point based on one or more parameters of pivot point 752B.

To determine the reference point based on the one or more parameters of the pivot point, the G-PCC coder may determine, in the reference frame, a reference pivot point based on an azimuth of the pivot point; and determine the reference point based on the reference pivot point. For instance, the G-PCC coder may determine, in reference frame 754, a point having a same azimuth (or same azimuth and same laser ID) as pivot point 752B. In the example of FIG. 7, the G-PCC coder may determine that point 756B is the reference pivot point as point 756B has a same azimuth as pivot point 752B. While the reference pivot point in the example of FIG. 7 corresponds to an actual point (e.g., an actual point in frame 754), the techniques of this disclosure are not necessarily so limited. For instance, in some examples, the reference pivot point may be a virtual point that does not correspond to a reconstructed point in reference frame 754.

In some examples, the G-PCC coder may determine the reference pivot point based on an actual (e.g., unscaled) azimuth of the pivot point. In other examples, the G-PCC coder may determine the reference pivot point based on a scaled azimuth of the pivot point. For instance, the G-PCC coder may determine the scaled azimuth by scaling the azimuth of the pivot point by a constant value.

To determine the reference point based on the reference pivot point, the G-PCC coder may identify, as the reference point in the reference frame, a point having an azimuth that greater than an azimuth of the reference pivot point. For instance, the G-PCC coder may determine which of points 756 have azimuth values greater than an azimuth value of the reference pivot point, and select (from the set of points 756 having azimuth values greater than the azimuth value of the reference pivot point) the point having the smallest azimuth value. In this example of FIG. 7, point 756A may be the point in reference frame 754 that has the smallest azimuth that is larger than the azimuth of reference pivot point 765B. As such, the G-PCC coder may identify point 756A as the reference point for performing intra prediction of current point 752A.

In some examples, the G-PCC coder may determine the reference point based on an actual (e.g., unscaled) azimuth of the reference pivot point. In other examples, the G-PCC coder may determine the reference point based on a scaled azimuth of the reference pivot point. For instance, the G-PCC coder may determine the scaled azimuth of the reference pivot point by scaling the azimuth of the pivot point by a constant value. As such, in some examples, the G-PCC coder may determine the reference point by identifying, as the reference point, a point having a smallest scaled azimuth that is larger than the scaled azimuth of the reference pivot point (e.g., point 756A). In some examples, the G-PCC coder may utilize the point with the second smallest azimuth greater than the scaled azimuth. For instance, the G-PCC coder may determine the reference point by identifying, as the reference point, a point having a second smallest scaled azimuth that is larger than the scaled azimuth of the reference pivot point (e.g., point 756L).

The G-PCC coder may predict parameters of current point 752A based on parameters of reference point 756A. For instance, the G-PCC coder may signal a residual data that represents differences between parameters of current point 752A and reference point 756A. The G-PCC decoder may add the residual data to the parameters of reference point 756A to reconstruct the parameters of current point 752A.

While discussed above as using a single reference point in a single reference frame, the techniques of this disclosure are not so limited. As one example, multiple reference points in a single reference frame may be used to predict the current point. For instance, the G-PCC coder may determine, in a reference frame and based on a reference pivot point, a plurality of reference points. The G-PCC coder may predict one or more parameters of a current point in a current frame based on the plurality of reference points. As another example, reference points from multiple reference frames may be used to predict the current point.

As discussed above, a G-PCC coder may perform azimuth prediction. Let (r, phi, laserID) be the three coordinates of the pivot point (referred to as radius, azimuth and laser ID) in the spherical coordinate system. Techniques disclosed herein may also apply to other coordinate systems.

In some examples, the G-PCC coder may code points in the current point cloud frame in an ordered fashion as follows:

1. For a current point in the current frame, the G-PCC coder may choose a pivot point in the current frame that is preceding the first point in decoding order. In some examples, the pivot point is the preceding point in the current frame in the decoding order. In some examples, the pivot point is the second preceding point in the current frame in the decoding order. More generally, more than one preceding point may be chosen as pivot points of the current point. In some examples, the pivot point may be a virtual point derived based on a previously decoded point in the current frame and azimuth displacement that are a multiple of azimuth quantization scale value (pre-determined or derived from signaled syntax elements).

2. The G-PCC coder may choose a point in reference frame, reference pivot point, that is associated with the pivot point. The reference pivot point may be chosen as a point in the reference frame that has the same azimuth and laser ID as the pivot point. In some examples, points with other laser ID values may also be candidates for reference pivot point (e.g., the reference pivot point may be chosen as the point in the reference frame that has the same azimuth as the pivot point and laser ID in the range of [LaserID−M, LaserID+M], where LaserID is the laser ID of the pivot point and M is a fixed value (e.g., 1) or chosen based on distance of the pivot point from the origin, or derived as function of LaserID (e.g., for smaller values of LaserID, M may be smaller and for larger values of LaserID, M may be larger)). In some examples, a distance metric may be defined using azimuth and laser ID, and the reference pivot point is chosen as the point that has smallest distance from the azimuth and laser ID of the pivot point using the distance metric. A normalized azimuth value may be obtained by scaling the azimuth by a first constant value; a normalized laser ID may be obtained by scaling the laserID by a second constant value; the distance metric may be obtained by computing a norm (e.g., L2-norm, L1-norm) for the normalized laser ID and azimuth value of the pivot point and the reference points. More generally, the reference pivot point may be chosen as a point in the reference frame that is in the neighbourhood of points with the same azimuth and laser ID as the pivot point. In some examples, the reference pivot point may be a virtual point in the reference frame that is derived from the pivot point that has the same azimuth and laser ID as the pivot point.

3. The G-PCC coder may choose a reference point in the reference frame that is associated with the reference pivot point. The reference point may be chosen as the point in the reference frame that has the smallest azimuth that is larger than that of reference pivot point and the same laser ID as the reference pivot point. The reference point may be chosen as the point in the reference frame that has the second smallest azimuth that is larger than that of reference pivot point and the same laser ID as the reference pivot point. In some examples, when the reference point is not available, inter prediction may be disabled for the current point. In some examples, the reference point may be chosen as the reference pivot point.

4. The G-PCC coder may compute a first residual between the reference point and the reference pivot point.

5. The G-PCC coder may use the first residual to derive a first prediction for the current value. The prediction may be derived by adding the components of the first residual to the respective components of the pivot point (e.g., the radius prediction may be obtained by adding the radius component of the first residual to the radius component of the pivot point (similarly for azimuth)). In some examples, the first prediction may be set equal to the reference point.

6. The G-PCC coder may code a second residual between the first prediction and the position of the current point.

7. Composition of residual: one or more residuals disclosed in this disclosure may include one or more of the following: The residual may comprise a radius residual between the reference pivot point and the reference point. The residual may comprise an azimuth residual between the reference pivot point and the reference point.

8. The G-PCC coder may derive a current point based on the first prediction and second residual. In some examples, the G-PCC coder may derive the current point from the second residual (e.g., and not based on the first prediction).

The G-PCC coder may apply one or more techniques described above to a quantized azimuth value; the scale value used for the quantization may be derived from signaled values or pre-determined. The quantized azimuth value and laserID may be used to search an inter predicted point in the reference. For example, the azimuth of a previously decoded and reconstructed point may be quantized and an inter predicted point with a quantized azimuth and laserID that is closest to the quantized azimuth and laserID of the previous point may be selected as predictor for the azimuth, radius and laserID of the current point, either as quantized/dequantized predictor or unquantized.

The G-PCC coder may apply one or more techniques described above to a quantized laserID value; the scale value used for the quantization may be derived from signaled values or pre-determined. The azimuth and quantized laserID value may be used to search an inter predicted point in the reference. For example, the laserID of a previously decoded and reconstructed point may be quantized and an inter predicted point with an azimuth and quantized laserID that is closest to the azimuth and quantized laserID of the previous point may be selected as predictor for the azimuth, radius and laserID of the current point, either as quantized/dequantized predictor or unquantized.

The G-PCC coder may apply one or more techniques described above to a quantized azimuth and quantized laserID value; the scale values used for the quantization may be derived from signaled values or pre-determined. The quantized azimuth and quantized laserID value may be used to search an inter predicted point in the reference. For example, the azimuth and laserID of a previously decoded and reconstructed point may be quantized and an inter predicted point with a quantized azimuth and quantized laserID that is closest to the quantized azimuth and quantized laserID of the previous point may be selected as predictor for the azimuth, radius and laserID of the current point, either as quantized/dequantized predictor or unquantized.

In some examples, the reference frame may refer to a set of (radius, azimuth, laserID) tuples that are derived from the reference frame. For example, for each point in the reference frame, the G-PCC coder may add a radius, azimuth, laser ID to the set if there is no other point in the set that has the same azimuth the laser ID. In some cases, a quantized value of azimuth may be added. In some cases, a (r, phi, laserID) may be added even if there is another tuple in the set with same phi and laserID, e.g., (r1, phi, laserID), if the value of r is less than the value or r1 (in this case, the tuple (r1, phi, laserId) that was present may be replaced by the new (r, phi, laserID)). In some cases, the points in the reference frame may be in the x,y,z domain; the points may be stored for reference as is, or by converting it to the spherical domain. In some cases, a motion compensated position may be added to the reference frame. The compensation may be based on a motion vector (e.g., global motion vector with rotation and/or translation) signaled that is associated with the current frame and reference frame.

The G-PCC coder may perform context selection for inter-prediction modes. As discussed above, the G-PCC coder may signal inter prediction flag and inter prediction mode. The context to be used by the G-PCC coder for coding the inter prediction flag or inter prediction mode may be chosen as follows: The G-PCC coder may set b1, b2, b3, . . . , bN to be the inter prediction flag values for the N previously decoded points (b1 is the immediately preceding node, b2, immediately preceding b1, etc. The G-PCC coder may chose the context index as the number generated by using the b1, b2, . . . , bN as follows: ctxIdx=b1+b2<<1+b3<<2+bN<<(N−1). In another example, the G-PCC coder may chose the context index as b1+b2+ . . . +bN. In some examples, the value of b1, b2, bN, may also be used to choose the context of other syntax elements such as inter prediction mode, motion vector, etc. In some examples N could be fixed as 5.

The G-PCC coder may perform improved radius residual coding. The radius, azimuth and laserID associated with each point may be coded in predictive geometry coding. The residual of the radius component of each point may be coded with an "equal_to_zero" flag, a sign bit, a number of bits for the remaining residual and/or the remaining residual. The number of bits may be an indicator of the relative magnitude of the radius residual. When LIDAR captured points are close to each other in the point cloud (e.g., points of an object or building captured by one of the lasers), the radius may not change by much across the points. Since the object (most likely solid) is continuous, successive LIDAR scan points may be returned to the sensor where the azimuth difference between successive points is close to the sampling frequency of the azimuth. The difference in the azimuth, or azimuth residual, for adjacent points (of the same laser) on an object is close to zero.

The context of number of bits of radius residual is chosen based on the azimuth residual of the current point. For example, based on the magnitude of the azimuth residual the context may be switched as follows where N is a fixed value (signaled or predetermined). Table 1, below, provides one example of context index for number of bits used in number of bits for radius residual N.

TABLE 1

| Context index for number of bits used in number of bits for radius residual | | |
|---|---|---|
| Abs(azimResi) | N = 3 | N = 4 |
| 0 | 1 | 1 |
| 1 | 1 | 1 |
| 2 | 2 | 2 |
| 3 | 3 | 3 |
| 4 | 0 | 4 |
| >=5 | 0 | 0 |

Note that other methods to choose the context index based on the radius residual may also be used.

The following specific examples show implementations of several techniques of this disclosure.

Example A

For each point in the point cloud frames that are not all-intra coded (random access point), a flag may be used to specify whether a point is coded with inter-prediction. When inter-prediction is applied, a "zero motion vector" candidate is chosen to predict the radius of predicted point from a point in a reference frame that has the same laser ID value as the current point and that has the closest quantized azimuth value as the current point. Changes to the syntax structure is provided below (<ADD> . . . </ADD> tags indicate additions and <DELETE> . . . </DELETE> tags indicate deletions):

| | Descriptor |
|---|---|
| geometry_predtree_node( nodeIdx ) { | |
|   if( geom_scaling_enabled_flag && !( nodeIdx % PtnQpInterval ) ) { | |
|     ptn_qp_offset_abs_gt0_flag | ae(v) |
|     if( ptn_qp_offset_abs_gt0_flag ) { | |
|       ptn_qp_offset_sign_flag | ae(v) |
|       ptn_qp_offset_abs_minus1 | ae(v) |
|     } | |
|   } | |
|   if( unique_geometry_points_flag ) { | |
|     ptn_point_cnt_gt1_flag | ae(v) |
|     if( ptn_point_cnt_gt1_flag ) | |
|       ptn_point_cnt_minus2 | ae(v) |
|   } | |
|   ptn_child_cnt[ nodeIdx ] | ae(v) |
|   ptn_pred_mode[ nodeIdx ] | ae(v) |
|   if( geometry_angular_enabled_flag ) { | |
|     ptn_phi_mult_abs_gt0_flag | ae(v) |
|     if( ptn_phi_mult_abs_gt0_flag ) { | |
|       ptn_phi_mult_sign_flag | ae(v) |
|       ptn_phi_mult_abs_gt1_flag | ae(v) |
|       if( ptn_phi_mult_abs_gt1_flag ) | |
|         ptn_phi_mult_abs_minus2 | |
|       if( ptn_phi_mult_abs_minus2 == 7 ) | |
|         ptn_phi_mult_abs_minus9 | ae(v) |
|     } | |
|   } | |
|   <ADD>if( PtnPhiMult[nodeIdx] && InterEnableFlag ) | |
|     ptn_inter_flag[ nodeIdx ] | u(1)<br></ADD> |
|   numComp = geometry_angular_enabled_flag<br>&& !number_lasers_minus1 ? 2 : 3 | |
|   for( k = 0; k < numComp; k++ ) { | |
|     ptn_residual_abs_gt0_flag[ k ] | ae(v) |
|     if( ptn_residual_abs_gt0_flag[ k ] ) { | |
|       if( k || ptn_pred_mode[ nodeIdx ] <ADD> \|\|<br>ptn_inter_flag[ nodeIdx ] </ADD>) | |
|         ptn_residual_sign_flag[ k ] | ae(v) |
|       ptn_residual_abs_log2 [ k ] | ae(v) |
|       ptn_residual_abs_remaining[ k ] | ae(v) |
|     } | |
|   } | |
|   if( geometry_angular_enabled_flag ) | |
|     for( k = 0; k < 3; k++ ) { | |
|       ptn_sec_residual_abs_gt0_flag[ k ] | ae(v) |
|       if( ptn_sec_residual_abs_gt0_flag[ k ] ) { | |
|         ptn_sec_residual_sign_flag[ k ] | ae(v) |
|         ptn_sec_residual_abs_gt1_flag[ k ] | ae(v) |
|         if( ptn_sec_residual_abs_gt1_flag[ k ] ) | |
|           ptn_sec_residual_abs_minus2[ k ] | ae(v) |
|       } | |
|     } | |
|   for( i = 0; i < ptn_child_cnt[ nodeIdx ]; i++ ) | |
|     geometry_predtree_node( ++PtnNodeIdx ) | |
| } | |

<ADD> ptn_inter_flag[nodeIdx] equal to 0 specifies that the radius residual of the current node is coded with intra-prediction. ptn_inter_flag[nodeIdx] equal to 1 specifies that the radius residual of the current node is coded with inter-prediction. When not present, the value of ptn_inter_flag[nodeIdx] is inferred to be equal to 0.

</ADD>

The value of InterEnableFlag is set to 0 when the current point cloud frame is a random access point or an all-intra frame, and set to 1 otherwise.

In some alternatives, when ptn_inter_flag is equal to 1, the syntax element ptn_pred_mode[ ] is not signaled and is inferred to be a default value (e.g., equal to 0 corresponding to predictive geometry mode 0).

Changes to the position prediction process are as follows:

Position Prediction Process

The inputs to this process are:

the variable predMode indicating the prediction mode of current node, the arrays aPos0, aPos1, and aPos2, with values aPosX[k], k=0 . . . 2, and X=0 . . . 2. Each array contains the position associated with the X-th generation ancestor node in the depth-first tree traversal order, the variable curDepth, indicating the distance in nodes between the current node and the root node of the current predictive tree,

<ADD>

A variable interFlag indicating whether the radius of the current node is coded with inter-prediction.

</ADD>

The output from this process is the array predPos, with values predPos[k], k=0 . . . 2, indicating the predicted point position associated with the nodeIdx-th tree node. When predMode is equal to 0, the predicted point position is calculated as follows,

```
for (k = 0; k < 3; k++)
    predPos[k] = 0
if (geometry_angular_enabled_flag) {
    predPos[0] = ptn_radius_min_value
    if (curDepth > 0) {
        predPos[1] = aPos0[1]
        predPos[2] = aPos0[2]
    }
}
```

When predMode is equal to 1, the predicted point position is the position associated with the first ancestor.
for (k=0; k<3; k++)
    predPos[k]=aPos0[k]
When predMode is equal to 2, the predicted point position is a linear combination of the positions associated with the first two ancestors
for (k=0; k<3; k++)
    predPos[k]=aPos0[k]+aPos0[k]−aPos1[k]
Otherwise, predMode is equal to 3, the predicted point position is a linear combination of the positions associated with all three ancestors
for (k=0; k<3; k++)
    predPos[k]=aPos0[k]+aPos1[k]−aPos2[k]
<ADD>
When interFlag is equal to 1, predPos[0] is derived as follows. Let refFramePos[k] for k=0 . . . 2 be the position of the point in the reference frame such that refFramePos[2]=predPos[2] and the absolute difference between the value of refFramePos[1] and predPos[1] is the lowest among the points in the reference frame. predPos[0] is set equal to refFramePos[0].
</ADD>
In one alternative, a quantized value of refFramePos[1] and predPos[1] is used to measure the absolute difference in values, where the quantization scale may be a fixed number (e.g., geom_angular_azimuth_step_minus1+1)

Example B

In example B, the prediction mode may not be signaled when inter prediction is used. For instance, when inter prediction is used, prediction mode is inferred to be equal to 0. Changes to the syntax structure is provided below (<ADD> . . . </ADD> tags indicate additions and <DELETE> . . . </DELETE> tags indicate deletions):

```
}
    ptn_child_cnt[ nodeIdx ]                              ae(v)
    <DELETE> ptn_pred_mode[ nodeIdx ]                     ae(v)
                                                          </DELETE>
    if( geometry_angular_enabled_flag ) {
        ptn_phi_mult_abs_gt0_flag                         ae(v)
        if( ptn_phi_mult_abs_gt0_flag ) {
            ptn_phi_mult_sign_flag                        ae(v)
            ptn_phi_mult_abs_gt1_flag                     ae(v)
            if( ptn_phi_mult_abs_gt1_flag )
                ptn_phi_mult_abs_minus2                   ae(v)
            if( ptn_phi_mult_abs_minus2 = = 7 )
                ptn_phi_mult_abs_minus9                   ae(v)
        }
    }
    <ADD>if( PtnPhiMult[nodeIdx] && InterEnableFlag )
        ptn_inter_flag[ nodeIdx ]                         u(1)
    if( !ptn_inter_flag[ nodeIdx ] )
        ptn_pred_mode[ nodeIdx ]                          ae(v)
                                                          </ADD>
    numComp = geometry_angular_enabled_flag
        && !number_lasers_minus1 ? 2 : 3
    for( k = 0; k < numComp; k++ ) {
```

When ptn_pred_mode[nodeIdx] is not signaled, ptn_pred_mode[nodeIdx] may be inferred to be equal to 0. In some examples, the following inference may be added: When ptn_inter_flag[nodeIdx] is equal to 1, ptn_pred_mode[nodeIdx] is inferred to be equal to 0.

Example C

In example C, the order of signaling of phi and prediction mode may not be modified. The signaling of prediction mode may be conditioned on the signaling of inter flag. The signaling of ptn_phi_mult_abs_gt0_flag may also be conditioned on the inter flag. Changes to the syntax structure are provided below (<ADD> . . . </ADD> tags indicate additions and <DELETE> . . . </DELETE> tags indicate deletions):

```
}
    ptn_child_cnt[ nodeIdx ]                              ae(v)
    <ADD>if( InterEnableFlag )
        ptn_inter_flag[ nodeIdx ]                         u(1)
    if( !ptn_inter_flag[ nodeIdx ] )
        ptn_pred_mode[ nodeIdx ]                          ae(v)
                                                          </ADD>
    if( geometry_angular_enabled_flag ) {
        <ADD>if( !ptn_inter_flag[ nodeIdx ] ) </ADD>
            ptn_phi_mult_abs_gt0_flag                     ae(v)
        if( ptn_phi_mult_abs_gt0_flag ) {
            ptn_phi_mult_sign_flag                        ae(v)
            ptn_phi_mult_abs_gt1_flag                     ae(v)
            if( ptn_phi_mult_abs_gt1_flag )
                ptn_phi_mult_abs_minus2                   ae(v)
            if( ptn_phi_mult_abs_minus2 = = 7 )
                ptn_phi_mult_abs_minus9                   ae(v)
        }
    }
    numComp = geometry_angular_enabled_flag
        && !number_lasers_minus1 ? 2 : 3
    for( k = 0; k < numComp; k++ ) {
```

When ptn_inter_flag[nodeIdx] is not signaled, ptn_inter_flag[nodeIdx] is inferred to be equal to 0.

When ptn_phi_mult_abs_gt0_flag[nodeIdx] is not signaled, ptn_phi_mult_abs_gt0_flag[nodeIdx] is inferred to be equal to 0. In another example, the following inference is added: When ptn_inter_flag[nodeIdx] is equal to 1, ptn_phi_mult_abs_gt0_flag[nodeIdx] is inferred to be equal to 1.

Example D

In example D, the order of pred mode and phi syntax elements may not be changed. For instance, inter flag may be signaled after pred mode but before the phi syntax elements.

```
}
    ptn_child_cnt[ nodeIdx ]                              ae(v)
    ptn_pred_mode[ nodeIdx ]                              ae(v)
    <ADD>if( InterEnableFlag && !ptn_pred_mode[ nodeIdx ] )
```

-continued

```
    ptn_inter_flag[ nodeIdx ]                              u(1)
                                                           </ADD>
    if( geometry_angular_enabled_flag ) {
        <ADD> if( !ptn_inter_flag[ nodeIdx ] )
    </ADD>
        ptn_phi_mult_abs_gt0_flag                          ae(v)
        if( ptn_phi_mult_abs_gt0_flag ) {
            ptn_phi_mult_sign_flag                         ae(v)
            ptn_phi_mult_abs_gt1_flag                      ae(v)
            if( ptn_phi_mult_abs_gt1_flag )
                ptn_phi_mult_abs_minus2                    ae(v)
            if( ptn_phi_mult_abs_minus2 = = 7 )
                ptn_phi_mult_abs_minus9                    ae(v)
        }
    }
    numComp = geometry_angular_enabled_flag
&& !number_lasers_minus1 ? 2 : 3
    for( k = 0; k < numComp; k++ ) {
```

When ptn_pred_mode[nodeIdx] is greater than 0 and InterEnableFlag is equal to 1 (ptn_inter_flag[ ] is not signaled), ptn_inter_flag[nodeIdx] is inferred to be 0.

Example E

Example E is similar to Example A, with the modification that the signaling of inter flag is also dependent on the value of pred_mode. The entirety of the following syntax is added.

```
    if( ( PtnPhiMult[nodeIdx] || !ptn_pred_mode[ nodeIdx ] ) &&
InterEnableFlag )
        ptn_inter_flag[ nodeIdx ]                          u(1)
```

When InterEnableFlag is equal 1, and PtnPhiMult[nodeIdx] is equal to 0 or ptn_pred_mode[nodeIdx] is not equal to 0, ptn_inter_flag[nodeIdx] is inferred to be equal to 0.

Example F

In this example, the prediction for radius, predPos[0], is obtained by not just comparing the azimuth of points that have the same laser ID as the current point, but also points of adjacent laser IDs.

When interFlag is equal to 1, the G-PCC coder may derive predPos[0] as follows. The G-PCC coder may set refFramePos[k] for k=0 . . . 2 to be the position of the point in the reference frame such that refFramePos[2] takes one of values in {predPos[2]−1, predPos[2], predPos[2]+1} and the absolute difference between the value of refFramePos[1] and predPos[1] is the lowest among the points in the reference frame. The G-PCC coder may set predPos[0] equal to refFramePos[0].

In one case, points from more laser IDs in the reference frame may be considered to obtain the reference point.

In another case, instead of comparing the azimuth (i.e., refFramePos[1] and predPos[1]), a weighted cost function may be specified as follows:

$$J(refPos)=w1*f1(refPos[1],predPos[1])+w2*f2(refPos[2],predPos[2])$$

The point in the reference frame with position refPos[k] for k=0 . . . 2, that is chosen for predicting the radius is the point that has the smallest value of J(refPos).

In one case, the value of f1(x, y) may be a square of a difference between x and y, or more generally any function that indicates a distance between the current point and reference point in the azimuth (or second) dimension.

In one case, the value of f2(x, y) may be a square of difference/absolute difference between x and y, or more generally any function that indicates a distance between the current point and reference point in the laser ID (or third) dimension.

In another case, more than one reference candidate may be chosen for a point and an inter pred candidate index may be signaled to specify which reference candidate is chosen for the point.

For example, for a current point, the three points in the reference frame may be chosen as follows:

Point with laser IDs equal to predPos[2]−1 that has an azimuth value that is closest to predPos[1]
Point with laser IDs equal to predPos[2] that has an azimuth value that is closest to predPos[1]
Point with laser IDs equal to predPos[2]+1 that has an azimuth value that is closest to predPos[1]

An index to this set/list may be signaled to specify the point that is chosen for prediction.

More generally, for each current point that is coded with inter prediction for radius:

A reference frame is chosen based on a pre-determined decision (e.g., previous decoded frame) or based on one or more signaled indications (e.g., frame index/counter value).
A set RefCandSuperSet is chosen among points in the reference frame based on a first set of conditions (e.g., one or more methods disclosed in this application based on laser ID range and/or azimuth range)
A subset RefCandSubset is chosen from RefCandSuperSet based on a second set of conditions (e.g., the closest azimuth from the current point for a particular laser ID, etc.)
If RefCandSubset has more than one entry, arrange the entries in a list RefCandList based on a third set of conditions (e.g., arrange the entries based on increasing laser ID difference from current point); otherwise (only one candidate in RefCandSubset), the one candidate in RefCandSubset is used for prediction.
Signal an index to the entry in RefCandList that is used for prediction.
Use the prediction entry for predicting the radius of the current point.

In some examples, when no point in the reference frame exists in RefCandSubset, inter prediction may be disabled, and the inter flag may or may not be signaled in this case.

Example G

In accordance with one or more aspects of this disclosure, a G-PCC coder may signal, in a bitstream, parameters for deriving the azimuth quantization/scale. In some examples, the G-PCC coder may inter-predict all the three components using a previously decoded point in a current point cloud frame.

The azimuth scale value (used in deriving the inter prediction candidate) may be signaled in the GPS as follows:

| | Descriptor |
|---|---|
| geometry_parameter_set( ) { | |
|   gps_geom_parameter_set_id | u(4) |
|   ... | |
|   } | |
|   gps_extension_flag | u(1) |
|   if( gps_extension_flag ) { | |

-continued

|  | Descriptor |
|---|---|
| inter_prediction_enabled_flag | u(1) |
| if(inter_prediciton_enabled_flag && pred_geom_enabled_flag) | |
|  inter_azim_scale_log2 | ue(v) |
| } | |
|  byte_alignment( ) | |
| } | |

In some examples, inter_azim_scale_log2 may be signaled irrespective of inter_prediction_enabled_flag.

In another examples, the angular mode may also be used to condition signaling of inter_azim_scale_log2.

|  |  |
|---|---|
| if (inter_prediction_enabled_flag && pred_geom_enabled_flag && geom_angular_enabled_flag) | |
|  inter_azim_scale_log2 | ue(v) |

The following is example semantics for the aforementioned syntax elements.

inter_prediction_enabled_flag equal to 1 specifies that inter prediction may be used for the point cloud frames that refer to the GPS. inter_prediction_enabled_flag equal to 0 specifies that inter prediction is not used for the point cloud frames that refer to the GPS.

inter_azim_scale_log2 is used to scale the azimuth points that may be used in the derivation of inter prediction reference. The value of inter_azim_scale_log2 shall be in the range of 0 to numAzimBits, inclusive.
(The variable numAzimB its may specify a maximum number of bits used to represent the azimuth.)

In some examples, the inter_azim_scale_log2 syntax element may be an example of a syntax element that specifies a log base 2 value of a scaling factor. A G-PCC coder may determine scaled azimuths (e.g., a scaled azimuth of a pivot point) based on the scaling factor.

When a frame is coded, a reconstructed spherical position of one or more points in the frame may be stored in a reference frame that may be used as inter prediction reference by a future frame. The reconstructed spherical position may be stored in a hash table as follows:

The G-PCC coder may obtain a spherical coordinate representation for a reconstructed point.
 The G-PCC coder may obtain a derived azimuth and laser index from the reconstructed point, and use the tuple of derived azimuth and laser index as the index to the hash table.

E.g., the derived a quantized azimuth, denoted as quantized (val) may be derived by the G-PCC coder as follows:
 int offset=azimScaleLog2? (1<<(azimScaleLog2−1)): 0;
 quantized(val)=val>=0 ? (val+offset)>>>azimScale Log2: −((−val+offset)>>>azimScaleLog2);

Note that in some cases, the azimScaleLog2 may not be signaled and inferred to one of the following:
 The value 0 (i.e., no quantization).
 The smallest power of 2 that is smaller than or equal to azimuth speed signaled in the bitstream.
 The smallest power of 2 that is smaller than or equal to (azimuth speed/2) signaled in the bitstream.
 Different sequences may have different azimuth scale values.
 Each entry in the hash table may be derived from one or more reconstructed points.

In one alternative, the hash table entry for a frame may be the first point in decoding order in the reconstructed frame that has a particular value of derived azimuth and laser index.

In one alternative, the hash table entry for a frame may be the point in the reconstructed frame that has the smallest radius among the points that have a particular value of derived azimuth and laser index.

In yet another alternative, the hash table entry for a frame may be the point value that corresponds with the average, mean, median, weighted average, geometric mean, etc. computed using the points that have a particular value of derived azimuth and laser index.

In some examples, a reconstructed point position in spherical domain (r, phi, laserID) may be entered in the azimuth table as follows: Table index=(quantized(Phi), laserID), Table entry=(r, phi, laserId).

When coding a current point (in a current frame), the following steps may be performed:
 The G-PCC coder may set prevNode=(r1, phi1, laserID1) to be the previous node in the current frame in the decoding order. In some alternatives, the prevNode may be chosen as the parent node of the current node.
 In the table associated with the reference frame, the G-PCC coder may check if there exists index (quantized(phi), laserID1) where quantized(phi) is greater than quantized(phi1). If such an index does not exist, the G-PCC coder may not apply inter prediction for the current node. If at least one such index exists, the G-PCC coder may choose the index with the smallest quantized(phi) (which is greater than quantized(phi1)).
 The G-PCC coder may use the entry associated with the above chosen index (r_inter, phi_inter, laserId_inter) as the inter predictor for the current point.

In some examples, the following code may be used to implement the above technique with a combination of array of hash tables (instead of a 2D hash table), where computePhiQuantized( ) corresponds to the quantize( ) function described earlier. In the case below, refPointVals is the vector of hash tables that stores the reference points, refPointVals[currLaserId] is the hash table that corresponds to index laserID=currLaserId, and all entries in refPointVals [currLaserId] are stored with increasing values of quantized (phi). Because this table is stored with increasing quantized (phi), the upper_bound function is used to search the first quantized(phi) laser is greater than the quantized current azimuth quantize(currAzim). In the example below, idx equal refPointVals[currLaserId].end( ), there is no such table index and hence inter prediction is not used. When present, idx->second specifies the inter prediction candidate (r_inter, phi_inter, laserID_inter).

In some alternatives, the hash table may not store the points with increasing value of quantized(phi), and instead use a hash function to parse and recover table entries. In another alternative, a generic table/data structure may be used to store the points from the reference frame. As noted above, the following code may be used to implement the above technique.

```
auto quantizedPhi = computePhiQuantized(currAzim);
if (refPointVals[currLaserId].size( )) {
  auto idx = refPointVals[currLaserId].upper_bound(quantizedPhi);
  if (idx == refPointVals[currLaserId].end( ))
    return std::pair<bool, point_t>(false, 0);
```

```
    else
        return std::pair<bool, point_t>(true, idx->second);
}
return std::pair<bool, point_t>(false, 0);
```

If inter prediction is used, the G-PCC coder may signal a flag indicating inter prediction is used.

Use the inter prediction candidate derived above to code the residual (at the decoder the prediction candidate is used to add the residual and derive the reconstructed spherical coordinate position of the current point.

Figure 8:
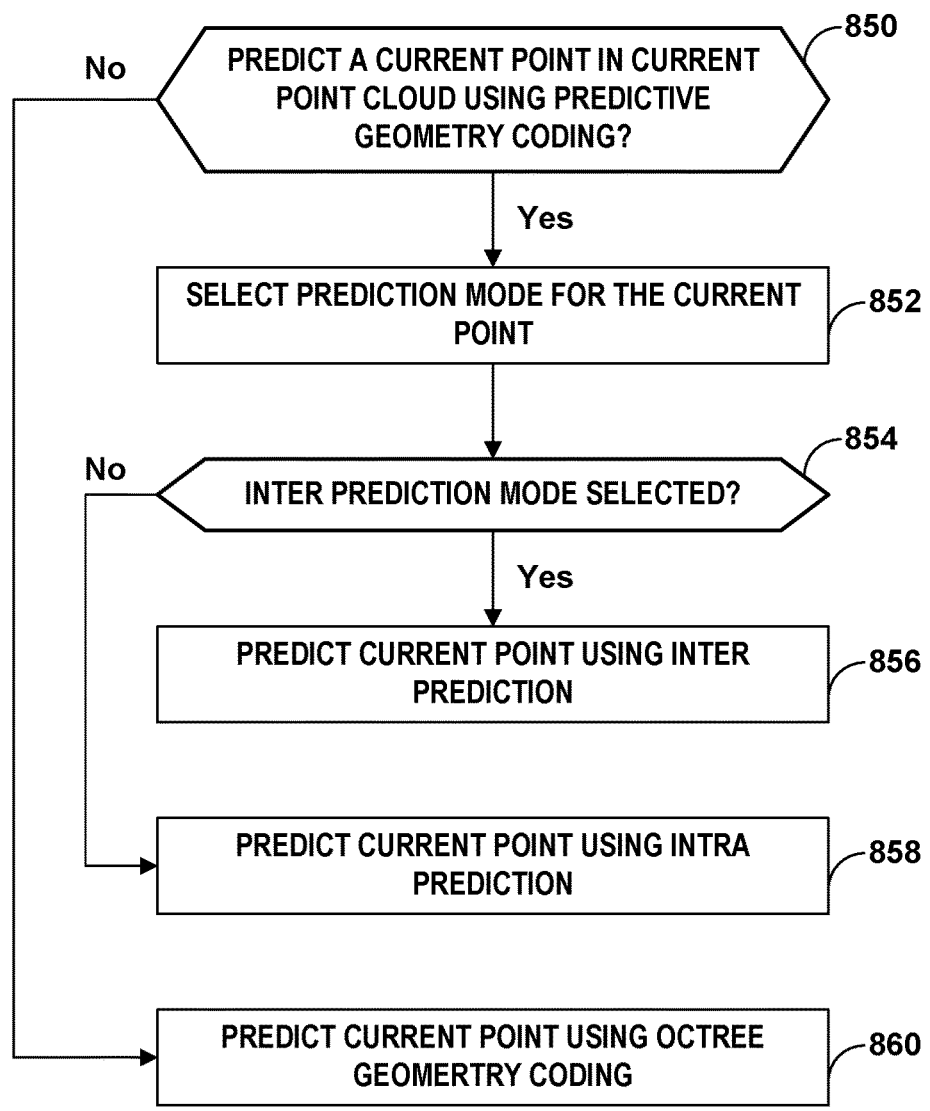
FIG. 8 is a flow diagram illustrating an example technique for inter predicting points of a point cloud, in accordance with one or more aspects of this disclosure.

FIG. 8 is a flow diagram illustrating an example technique for inter predicting points of a point cloud, in accordance with one or more aspects of this disclosure. Although described with respect to G-PCC encoder 200 (FIGS. 1 and 2), it should be understood that other devices may be configured to perform a method similar to that of FIG. 8.

G-PCC encoder 200 may determine whether to predict a current point in a current point cloud frame using predictive geometry coding (850). Responsive to determining to predict the current point using predictive geometry coding ("Yes" branch of 850), G-PCC encoder 200 may select, from a set of prediction modes, a prediction mode for the current point (852). The set of prediction modes may at least include an intra prediction mode and an inter prediction mode. G-PCC encoder 200 may select the prediction mode for the current point using a variety of techniques, but may generally select a prediction mode that results in minimizing a number of bits needed to be signaled. Responsive to determining not to predict the current point using predictive geometry coding ("No" branch of 850), G-PCC encoder 200 may predict the current point using a different technique, such as octree geometry coding (860).

G-PCC encoder 200 may determine whether the inter prediction mode is selected for the current point (854). Responsive to selecting the inter prediction mode for the current point ("Yes" branch of 854), G-PCC encoder 200 may predict the current point of the point cloud using inter prediction (856). Responsive to not selecting the inter prediction mode for the current point ("No" branch of 854), G-PCC encoder 200 may predict the current point of the point cloud using a different technique of predictive geometry coding, such as intra prediction (858).

To predict the current point of the point cloud using inter prediction (856), G-PCC encoder 200 may perform the technique discussed above with reference to FIG. 7. For instance, G-PCC encoder 200 may determine a pivot point in the current point cloud frame (i.e., a current point cloud or a current frame), determine a reference point cloud frame (i.e., a reference point cloud or a reference frame), determine a reference pivot point in the reference point cloud frame based on the pivot point in the current point cloud frame, determine a reference point in the reference point cloud frame based on the reference pivot point, and encode (e.g., in a bitstream) residual data representing differences between parameters (e.g., radius r, azimuth $\phi$, and laser index i) of the reference point and parameters of the current point.

In some examples, G-PCC encoder 200 may encode, in a bitstream, a first syntax element indicating whether the current point is coded using inter prediction. For instance, G-PCC encoder 200 may encode an inter-prediction flag with a value that indicates whether the current point is coded using inter prediction (e.g., a value of 0 may indicate that the current point is coded using intra prediction while a value of 1 may indicate that the current point is coded using inter prediction). A G-PCC decoder may determine whether the current point is coded using inter prediction based on the value of the first syntax element.

The signaling of the first syntax element (e.g., that indicates whether the current point is coded using inter prediction) may be conditional. As a first example condition, G-PCC encoder 200 may encode a second syntax element indicating whether inter prediction is enabled (e.g., for the current point cloud frame). Where G-PCC encoder 200 encodes the second syntax element with a value that indices that inter prediction is enabled, G-PCC encoder 200 may encode the first syntax element. On the other hand, where G-PCC encoder 200 encodes the second syntax element with a value that indices that inter prediction is not enabled, G-PCC encoder 200 may not encode the first syntax element. As another example condition, G-PCC encoder may signal (e.g., encode) the first syntax element where the current point cloud frame is not an intra coded frame (e.g., and not encode the first syntax element where the current point cloud frame is an intra coded frame). As another example condition, G-PCC encoder may signal (e.g., encode) the first syntax element where the current point cloud frame does not correspond to a random-access point (e.g., and not encode the first syntax element where the current point cloud frame does correspond to a random-access point). As another example condition, G-PCC encoder may signal (e.g., encode) the first syntax element where a slice that includes the current point is of a particular type (e.g., a type of slice that would allow for inter prediction, such as a P slice or a B slice). As another example condition, G-PCC encoder may signal (e.g., encode) the first syntax element where angular mode is enabled (e.g., and not encode the first syntax element where the angular mode is not enabled).

G-PCC encoder 200 may encode one or more syntax elements using context adaptive binary arithmetic coding (CABAC). In some examples, G-PCC encoder 200 may selected contexts based on a value of an inter prediction element (e.g., the first syntax element). As one example, G-PCC encoder 200 may select contexts for CABAC coding one or more syntax elements that represent a phi multiplier (e.g., ptn_phi_mult_abs_gt0_flag, ptn_phi_mult_sign_flag, ptn_phi_mult_abs_gt1_flag, ptn_phi_mult_abs_minus2, ptn_phi_mult_abs_minus9) based on the value of the inter prediction syntax element. As another example, G-PCC encoder 200 may select contexts for CABAC coding one or more syntax elements that represent primary residual data (e.g., ptn_residual_abs_gt0_flag, ptn_residual_sign_flag, ptn_residual_abs_log2, ptn_residual_abs_remaining) based on the value of the inter prediction syntax element. As another example, G-PCC encoder 200 may select a context for CABAC coding an instance of the inter prediction syntax element based on values of N previous instances (e.g., 2, 3, 4, 5, 6, 7, 8) of the inter prediction syntax element (e.g., instances of the inter prediction syntax element coded for previous points).

Figure 9:
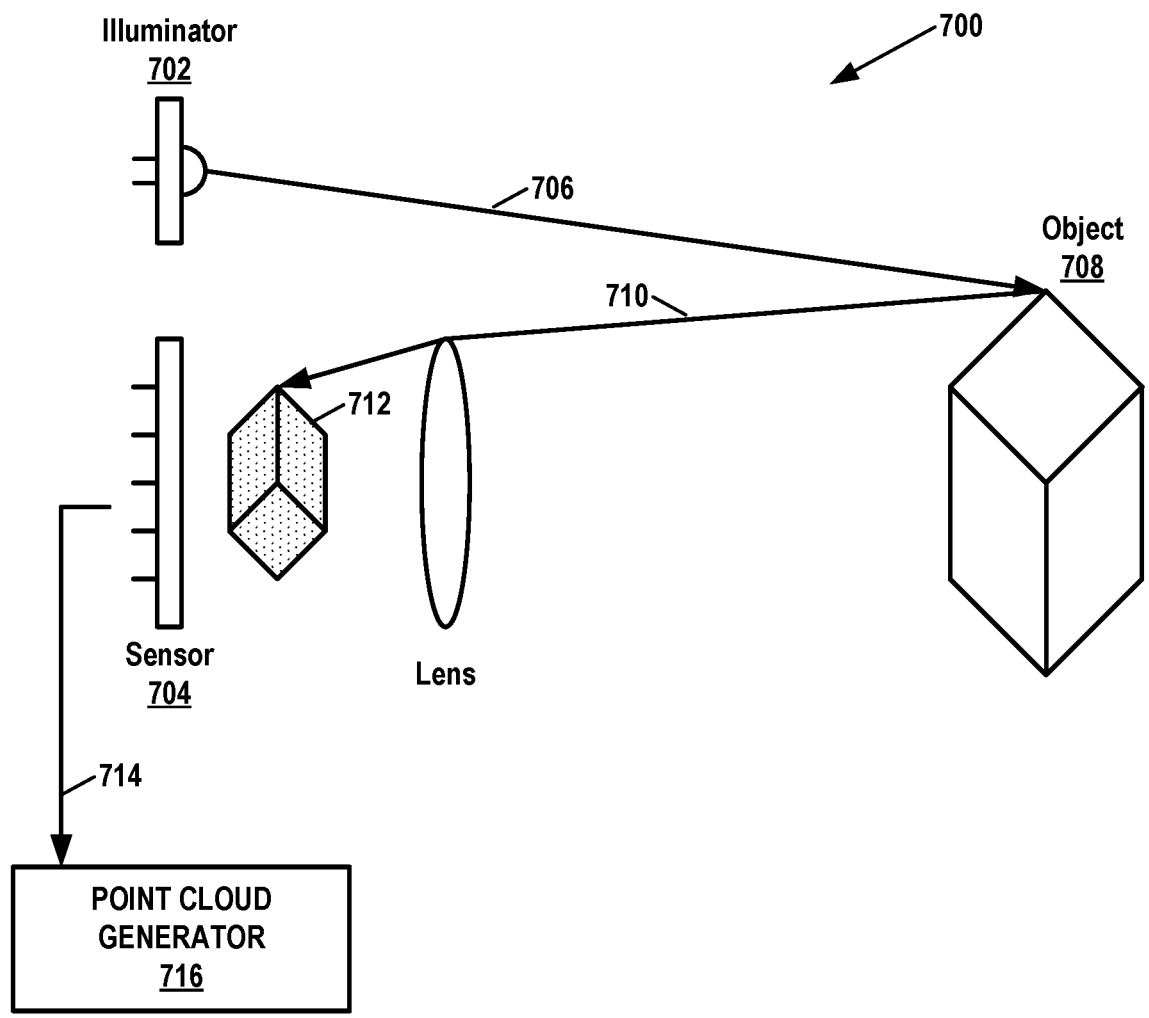
FIG. 9 is a conceptual diagram illustrating an example range-finding system that may be used with one or more techniques of this disclosure.

FIG. 9 is a conceptual diagram illustrating an example range-finding system 700 that may be used with one or more techniques of this disclosure. In the example of FIG. 9, range-finding system 700 includes an illuminator 702 and a sensor 704. Illuminator 702 may emit light 706. In some examples, illuminator 702 may emit light 706 as one or more laser beams. Light 706 may be in one or more wavelengths, such as an infrared wavelength or a visible light wavelength. In other examples, light 706 is not coherent, laser light. When light 706 encounters an object, such as object 708, light 706 creates returning light 710. Returning light 710 may include backscattered and/or reflected light. Returning light 710 may pass through a lens 711 that directs returning light 710 to create an image 712 of object 708 on sensor 704. Sensor 704 generates signals 714 based on image 712. Image 712 may comprise a set of points (e.g., as represented by dots in image 712 of FIG. 9).

In some examples, illuminator 702 and sensor 704 may be mounted on a spinning structure so that illuminator 702 and sensor 704 capture a 360-degree view of an environment (e.g., a spinning LIDAR sensor). In other examples, range-finding system 700 may include one or more optical components (e.g., mirrors, collimators, diffraction gratings, etc.) that enable illuminator 702 and sensor 704 to detect ranges of objects within a specific range (e.g., up to 360-degrees). Although the example of FIG. 9 only shows a single illuminator 702 and sensor 704, range-finding system 700 may include multiple sets of illuminators and sensors.

In some examples, illuminator 702 generates a structured light pattern. In such examples, range-finding system 700 may include multiple sensors 704 upon which respective images of the structured light pattern are formed. Range-finding system 700 may use disparities between the images of the structured light pattern to determine a distance to an object 708 from which the structured light pattern backscatters. Structured light-based range-finding systems may have a high level of accuracy (e.g., accuracy in the sub-millimeter range), when object 708 is relatively close to sensor 704 (e.g., 0.2 meters to 2 meters). This high level of accuracy may be useful in facial recognition applications, such as unlocking mobile devices (e.g., mobile phones, tablet computers, etc.) and for security applications.

In some examples, range-finding system 700 is a time of flight (ToF)-based system. In some examples where range-finding system 700 is a ToF-based system, illuminator 702 generates pulses of light. In other words, illuminator 702 may modulate the amplitude of emitted light 706. In such examples, sensor 704 detects returning light 710 from the pulses of light 706 generated by illuminator 702. Range-finding system 700 may then determine a distance to object 708 from which light 706 backscatters based on a delay between when light 706 was emitted and detected and the known speed of light in air). In some examples, rather than (or in addition to) modulating the amplitude of the emitted light 706, illuminator 702 may modulate the phase of the emitted light 706. In such examples, sensor 704 may detect the phase of returning light 710 from object 708 and determine distances to points on object 708 using the speed of light and based on time differences between when illuminator 702 generated light 706 at a specific phase and when sensor 704 detected returning light 710 at the specific phase.

In other examples, a point cloud may be generated without using illuminator 702. For instance, in some examples, sensors 704 of range-finding system 700 may include two or more optical cameras. In such examples, range-finding system 700 may use the optical cameras to capture stereo images of the environment, including object 708. Range-finding system 700 may include a point cloud generator 716 that may calculate the disparities between locations in the stereo images. Range-finding system 700 may then use the disparities to determine distances to the locations shown in the stereo images. From these distances, point cloud generator 716 may generate a point cloud.

Sensors 704 may also detect other attributes of object 708, such as color and reflectance information. In the example of FIG. 9, a point cloud generator 716 may generate a point cloud based on signals 714 generated by sensor 704. Range-finding system 700 and/or point cloud generator 716 may form part of data source 104 (FIG. 1). Hence, a point cloud generated by range-finding system 700 may be encoded and/or decoded according to any of the techniques of this disclosure.

Figure 10:
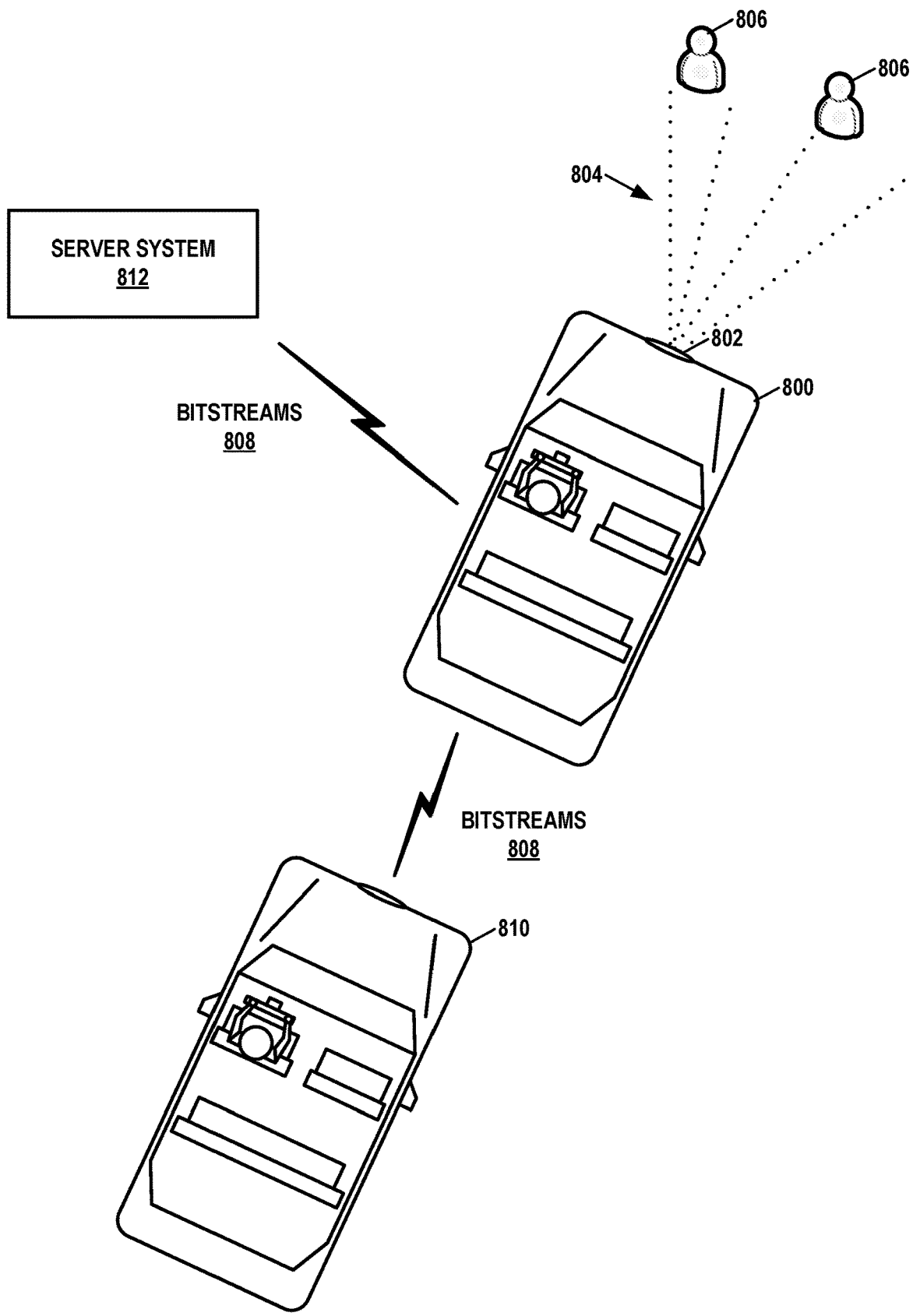
FIG. 10 is a conceptual diagram illustrating an example vehicle-based scenario in which one or more techniques of this disclosure may be used.

FIG. 10 is a conceptual diagram illustrating an example vehicle-based scenario in which one or more techniques of this disclosure may be used. In the example of FIG. 8, a vehicle 800 includes a range-finding system 802. Range-finding system 802 may be implemented in the manner discussed with respect to FIG. 10. Although not shown in the example of FIG. 10, vehicle 800 may also include a data source, such as data source 104 (FIG. 1), and a G-PCC encoder, such as G-PCC encoder 200 (FIG. 1). In the example of FIG. 10, range-finding system 802 emits laser beams 804 that reflect off pedestrians 806 or other objects in a roadway. The data source of vehicle 800 may generate a point cloud based on signals generated by range-finding system 802. The G-PCC encoder of vehicle 800 may encode the point cloud to generate bitstreams 808, such as geometry bitstream (FIG. 2) and attribute bitstream (FIG. 2). Bitstreams 808 may include many fewer bits than the unencoded point cloud obtained by the G-PCC encoder.

An output interface of vehicle 800 (e.g., output interface 108 (FIG. 1) may transmit bitstreams 808 to one or more other devices. Bitstreams 808 may include many fewer bits than the unencoded point cloud obtained by the G-PCC encoder. Thus, vehicle 800 may be able to transmit bitstreams 808 to other devices more quickly than the unencoded point cloud data. Additionally, bitstreams 808 may require less data storage capacity.

In the example of FIG. 10, vehicle 800 may transmit bitstreams 808 to another vehicle 810. Vehicle 810 may include a G-PCC decoder, such as G-PCC decoder 300 (FIG. 1). The G-PCC decoder of vehicle 810 may decode bitstreams 808 to reconstruct the point cloud. Vehicle 810 may use the reconstructed point cloud for various purposes. For instance, vehicle 810 may determine based on the reconstructed point cloud that pedestrians 806 are in the roadway ahead of vehicle 800 and therefore start slowing down, e.g., even before a driver of vehicle 810 realizes that pedestrians 806 are in the roadway. Thus, in some examples, vehicle 810 may perform an autonomous navigation operation based on the reconstructed point cloud.

Additionally or alternatively, vehicle 800 may transmit bitstreams 808 to a server system 812. Server system 812 may use bitstreams 808 for various purposes. For example, server system 812 may store bitstreams 808 for subsequent reconstruction of the point clouds. In this example, server system 812 may use the point clouds along with other data (e.g., vehicle telemetry data generated by vehicle 800) to train an autonomous driving system. In other example, server system 812 may store bitstreams 808 for subsequent reconstruction for forensic crash investigations.

Figure 11:
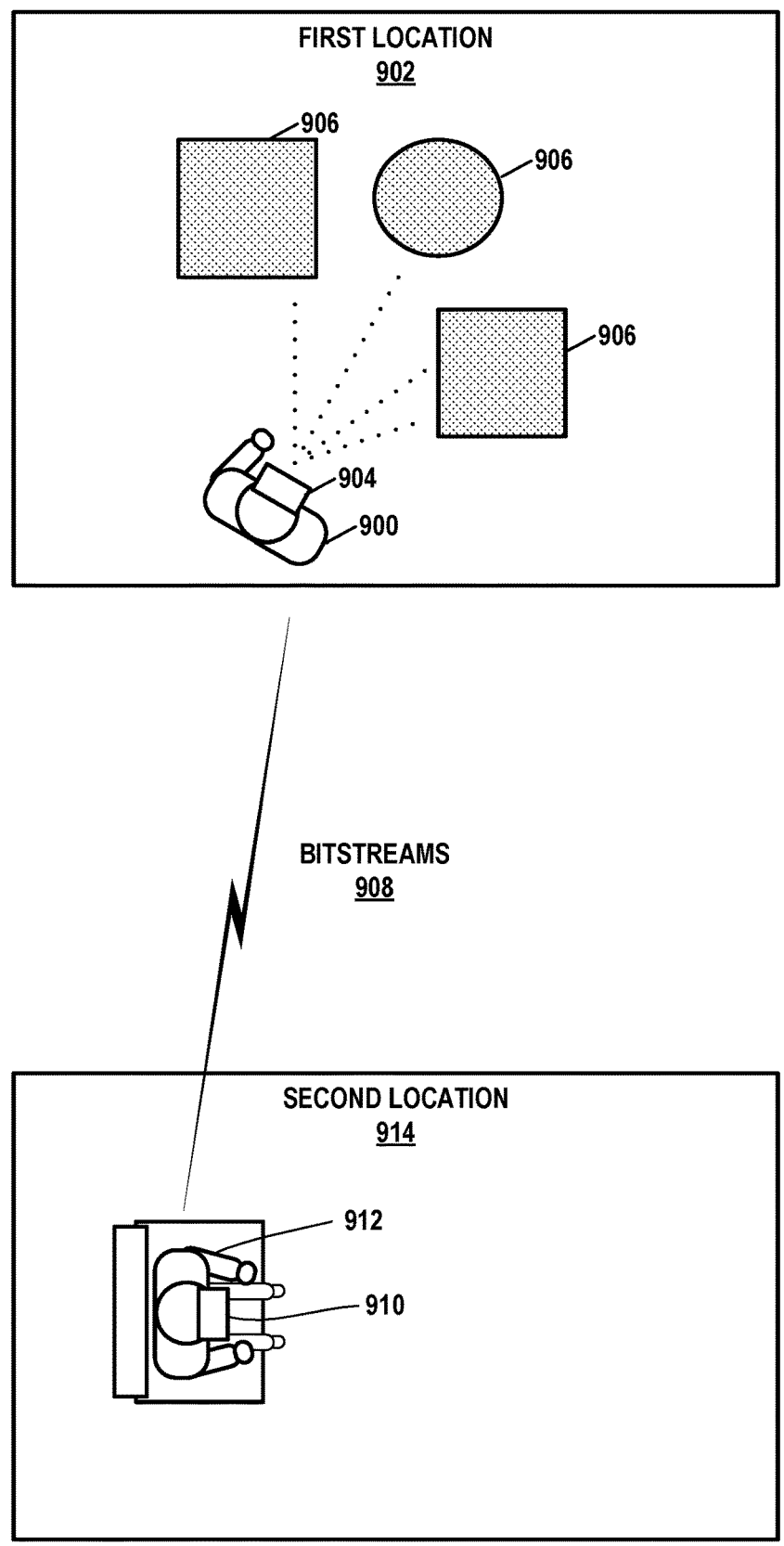
FIG. 11 is a conceptual diagram illustrating an example extended reality system in which one or more techniques of this disclosure may be used.

FIG. 11 is a conceptual diagram illustrating an example extended reality system in which one or more techniques of this disclosure may be used. Extended reality (XR) is a term used to cover a range of technologies that includes augmented reality (AR), mixed reality (MR), and virtual reality (VR). In the example of FIG. 11, a user 900 is located in a first location 902. User 900 wears an XR headset 904. As an alternative to XR headset 904, user 900 may use a mobile device (e.g., mobile phone, tablet computer, etc.). XR headset 904 includes a depth detection sensor, such as a range-finding system, that detects positions of points on objects 906 at location 902. A data source of XR headset 904 may use the signals generated by the depth detection sensor to generate a point cloud representation of objects 906 at location 902. XR headset 904 may include a G-PCC encoder (e.g., G-PCC encoder 200 of FIG. 1) that is configured to encode the point cloud to generate bitstreams 908.

XR headset 904 may transmit bitstreams 908 (e.g., via a network such as the Internet) to an XR headset 910 worn by a user 912 at a second location 914. XR headset 910 may decode bitstreams 908 to reconstruct the point cloud. XR headset 910 may use the point cloud to generate an XR visualization (e.g., an AR, MR, VR visualization) representing objects 906 at location 902. Thus, in some examples, such as when XR headset 910 generates an VR visualization, user 912 may have a 3D immersive experience of location 902. In some examples, XR headset 910 may determine a position of a virtual object based on the reconstructed point cloud. For instance, XR headset 910 may determine, based on the reconstructed point cloud, that an environment (e.g., location 902) includes a flat surface and then determine that a virtual object (e.g., a cartoon character) is to be positioned on the flat surface. XR headset 910 may generate an XR visualization in which the virtual object is at the determined position. For instance, XR headset 910 may show the cartoon character sitting on the flat surface.

Figure 12:
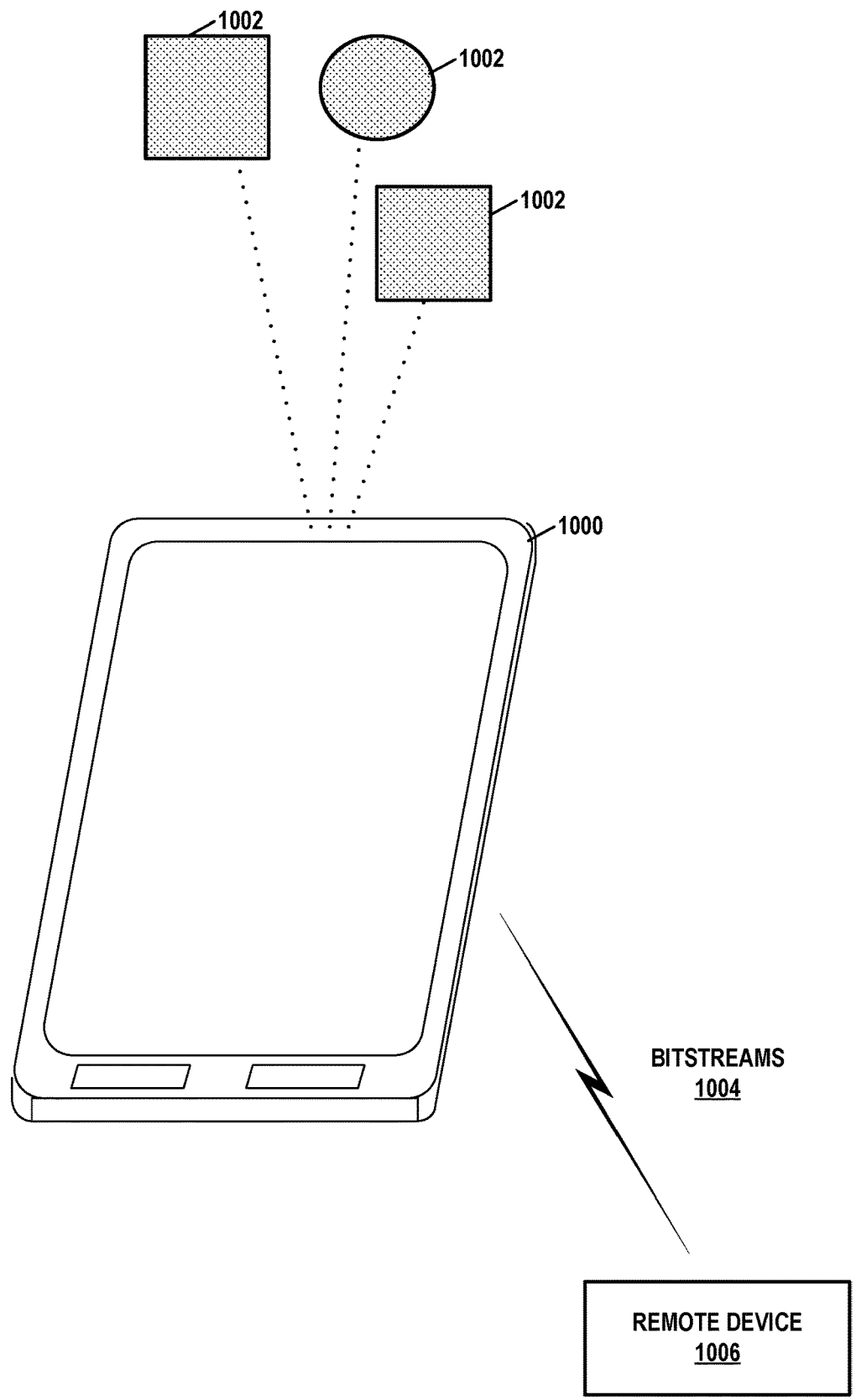
FIG. 12 is a conceptual diagram illustrating an example mobile device system in which one or more techniques of this disclosure may be used.

FIG. 12 is a conceptual diagram illustrating an example mobile device system in which one or more techniques of this disclosure may be used. In the example of FIG. 12, a mobile device 1000 (e.g., a wireless communication device), such as a mobile phone or tablet computer, includes a range-finding system, such as a LIDAR system, that detects positions of points on objects 1002 in an environment of mobile device 1000. A data source of mobile device 1000 may use the signals generated by the depth detection sensor to generate a point cloud representation of objects 1002. Mobile device 1000 may include a G-PCC encoder (e.g., G-PCC encoder 200 of FIG. 1) that is configured to encode the point cloud to generate bitstreams 1004. In the example of FIG. 12, mobile device 1000 may transmit bitstreams to a remote device 1006, such as a server system or other mobile device. Remote device 1006 may decode bitstreams 1004 to reconstruct the point cloud. Remote device 1006 may use the point cloud for various purposes. For example, remote device 1006 may use the point cloud to generate a map of environment of mobile device 1000. For instance, remote device 1006 may generate a map of an interior of a building based on the reconstructed point cloud. In another example, remote device 1006 may generate imagery (e.g., computer graphics) based on the point cloud. For instance, remote device 1006 may use points of the point cloud as vertices of polygons and use color attributes of the points as the basis for shading the polygons. In some examples, remote device 1006 may use the reconstructed point cloud for facial recognition or other security applications.

The following numbered clauses may illustrate one or more aspects of the disclosure:

Clause 1A. A method of processing a point cloud, the method comprising: selectively coding, using inter prediction, a point of the point cloud.

Clause 2A. The method of clause 1A, wherein coding the point using inter prediction comprises: coding, using inter prediction, a value of a radius residual of the point.

Clause 3A. The method of clause 2A, further comprising: coding, via a bitstream, a first syntax element indicating whether the point is coded using inter prediction.

Clause 4A. The method of clause 3A, further comprising: coding, via the bitstream, a second syntax element indicating whether inter prediction is enabled, wherein coding the first syntax element comprises coding the first syntax element responsive to the second syntax element indicating that inter prediction is enabled.

Clause 5A. The method of clause 3A or clause 4A, wherein the first syntax element comprises a ptn_inter_flag syntax element.

Clause 6A. The method of clause 4A or 5A, wherein the second syntax element comprises a InterEnableFlag syntax element.

Clause 7A. The method of clause 4A, wherein the second syntax element indicates whether inter prediction is enabled for a particular frame that includes the point.

Clause 8A. The method of any of clauses 1A-7A, further comprising: determining that angular mode is enabled; and responsive to determining that angular mode is enabled, determining that inter prediction is enabled.

Clause 9A. The method of any of clauses 1A-8A, wherein coding the point using inter prediction comprises coding a first subset of characteristics of the point using inter prediction, the method further comprising: coding a second subset of characteristics of the point using intra prediction.

Clause 10A. The method of any of clauses 1A-9A, wherein coding the point using inter prediction comprises determining a value of the point based on a reference frame.

Clause 11A. The method of any of clauses 1A-10A, further comprising: coding, in a bitstream, one or more syntax elements for predictive geometry parameters.

Clause 12A. The method of clause 11A, further comprising: determining a context for context adaptive coding of the one or more syntax elements for predictive geometry parameters based on value of one or more other syntax elements coded in the bitstream.

Clause 13A. The method of any of clauses 1A-12A, further comprising: coding, in a bitstream, one or more syntax elements having values that represent global motion parameters.

Clause 14A. The method of any of clauses 1A-13A, further comprising: coding, in a bitstream, a first syntax element that specifies whether inter prediction is enabled; and responsive to the first syntax element specifying that inter prediction is enabled, coding, in the bitstream, a second syntax element that specifies a scale for azimuth points.

Clause 15A. The method of any of clauses 1A-13A, further comprising: coding, in a bitstream, a first syntax element that specifies whether inter prediction is enabled; and coding, in the bitstream and regardless of whether the first syntax element specifies that inter prediction is enabled, a second syntax element that specifies a scale for azimuth points.

Clause 16A. The method of clause 14A or clause 15A, wherein: the first syntax element that specifies whether inter prediction is enabled comprises a inter_prediction_enabled_flag syntax element, and the second syntax element that specifies the scale for azimuth points comprises a inter_azim_scale_log2 syntax element.

Clause 17A. A device for processing a point cloud, the device comprising one or more means for performing the method of any of clauses 1A-16A.

Clause 18A. The device of clause 17A, wherein the one or more means comprise one or more processors implemented in circuitry.

Clause 19A. The device of any of clauses 17A or 18A, further comprising a memory to store the data representing the point cloud.

Clause 20A. The device of any of clauses 17A-19A, wherein the device comprises a decoder.

Clause 21A. The device of any of clauses 17A-20A, wherein the device comprises an encoder.

Clause 22A. The device of any of clauses 17A-21A, further comprising a device to generate the point cloud.

Clause 23A. The device of any of clauses 17A-22A, further comprising a display to present imagery based on the point cloud.

Clause 24A. A computer-readable storage medium having stored thereon instructions that, when executed, cause one or more processors to perform the method of any of clauses 1A-16A.

Clause 1B. A method of processing a point cloud, the method comprising: responsive to determining to predict a current point in the point cloud using predictive geometry coding, selecting, from a set of prediction modes, a prediction mode for the current point, wherein the set of prediction modes includes at least an intra prediction mode and an inter prediction mode; and responsive to selecting the inter prediction mode for the current point, predicting the current point of the point cloud using inter prediction.

Clause 2B. The method of clause 1B, wherein selecting the prediction mode comprises: coding, via a bitstream, a first syntax element indicating whether the current point is coded using inter prediction; and responsive to the first syntax element indicating that the current point is coded using inter prediction, selecting the inter prediction mode as the prediction mode for the current point.

Clause 3B. The method of clause 2B, further comprising: coding, via the bitstream, a second syntax element indicating whether inter prediction is enabled, wherein coding the first syntax element comprises coding the first syntax element responsive to the second syntax element indicating that inter prediction is enabled.

Clause 4B. The method of clause 3B, wherein the second syntax element indicates whether inter prediction is enabled for a particular frame that includes the current point.

Clause 5B. The method of clause 1B, wherein the current point is in a current frame, and wherein predicting the current point using inter prediction comprises: determining, in a reference frame that is different than the current frame, a reference point; and predicting one or more parameters of the current point based on the reference point.

Clause 6B. The method of clause 5B, wherein the reference frame is a motion compensated reference frame.

Clause 7B. The method of clause 5B, wherein predicting the one or more parameters comprises: predicting one or more of an azimuth, a laser identifier, and a radius of the current point.

Clause 8B. The method of clause 5B, wherein determining the reference point comprises: determining, in the current frame, a pivot point that precedes the current point in a coding order; and determining, based on one or more parameters of the pivot point, the reference point.

Clause 9B. The method of clause 8B, wherein determining the reference point based on the one or more parameters of the pivot point comprises: determining, in the reference frame, a reference pivot point based on an azimuth of the pivot point; and determining the reference point based on the reference pivot point.

Clause 10B. The method of clause 9B, wherein determining the reference pivot point further comprises determining the reference pivot point based on a laser identifier of the pivot point.

Clause 11B. The method of clause 9B, wherein the reference pivot point is a virtual point in the reference frame.

Clause 12B. The method of clause 9B, wherein determining the reference pivot point based on the azimuth of the pivot point comprises: determining the reference pivot point based on a scaled azimuth of the pivot point.

Clause 13B. The method of clause 12B, further comprising: coding a syntax element that specifies a log base 2 value of a scaling factor; and determining the scaled azimuth of the pivot point based on the scaling factor.

Clause 14B. The method of clause 9B, wherein determining the reference point based on the reference pivot point comprises: identifying, as the reference point in the reference frame, a point having an azimuth that is greater than an azimuth of the reference pivot point.

Clause 15B. The method of clause 14B, wherein identifying the point in the reference frame having the azimuth that is greater than the azimuth of the reference pivot point comprises: identifying, as the reference point in the reference frame, a point having a scaled azimuth that is greater than a scaled azimuth of the reference pivot point.

Clause 16B. The method of clause 15B, wherein identifying the point having the scaled azimuth that is greater than the scaled azimuth of the reference pivot point comprises: identifying, as the point, a point having a smallest scaled azimuth that is larger than the scaled azimuth of the reference pivot point.

Clause 17B. The method of clause 15B, wherein identifying the point having the scaled azimuth that is greater than the scaled azimuth of the reference pivot point comprises: identifying, as the point, a point having a second smallest scaled azimuth that is larger than the scaled azimuth of the reference pivot point.

Clause 18B. The method of clause 9B, wherein determining the reference point comprises: determining, in the reference frame and based on the reference pivot point, a plurality of reference points, wherein predicting the one or more parameters of the current point based on the reference point comprises predicting the one or more parameters of the current point based on the plurality of reference points.

Clause 19B. The method of clause 5B, wherein the identified reference point comprises a zero-motion candidate.

Clause 20B. The method of clause 1B, further comprising: coding, via a bitstream, a third syntax element indicating an inter prediction mode for the current point, wherein predicting the current point of the point cloud using inter prediction comprises predicting the current point using the inter prediction mode.

Clause 21B. The method of clause 1B, wherein selecting the prediction mode comprises: coding, via a bitstream, an inter prediction syntax element indicating whether the current point is coded using inter prediction; and selecting, when the inter prediction syntax element indicates that the current point is coded using inter prediction, the inter prediction mode as the prediction mode for the current point, the method further comprising: selecting a context for context adaptive binary arithmetic coding (CABAC) one or more syntax elements based on a value of the inter prediction syntax element.

Clause 22B. The method of clause 21B, wherein the one or more syntax elements comprise one or more of: one or more syntax elements that represent a phi multiplier; and one or more syntax elements that represent primary residual data.

Clause 23B. The method of clause 21B, further comprising: selecting a context for CABAC coding the inter prediction syntax element based on values of inter prediction syntax elements for N previous points of the point cloud.

Clause 24B. The method of clause 23B, wherein N is 5.

Clause 25B. A device for processing a point cloud, the device comprising: a memory configured to store at least a portion of the point cloud; and one or more processors implemented in circuitry and configured to: responsive to determining to predict a current point in the point cloud using predictive geometry coding, select, from a set of prediction modes, a prediction mode for the current point, wherein the set of prediction modes includes at least an intra prediction mode and an inter prediction mode; and responsive to selecting the inter prediction mode for the current point, predict, the current point of the point cloud using inter prediction.

Clause 26B. The device of clause 25B, wherein, to select the prediction mode, the one or more processors are configured to: code, via a bitstream, a first syntax element indicating whether the current point is coded using inter prediction; and select, responsive to the first syntax element indicating that the current point is coded using inter prediction, the inter prediction mode as the prediction mode for the current point.

Clause 27B. The device of clause 26B, wherein the one or more processors are further configured to: code, via the bitstream, a second syntax element indicating whether inter prediction is enabled, wherein, to code the first syntax element, the one or more processors are configured to code the first syntax element responsive to the second syntax element indicating that inter prediction is enabled.

Clause 28B. The device of clause 27B, wherein the second syntax element indicates whether inter prediction is enabled for a particular frame that includes the current point.

Clause 29B. The device of clause 25B, wherein the current point is in a current frame, and wherein, to predict the current point using inter prediction, the one or more processors are configured to: determine, in a reference frame that is different than the current frame, a reference point; and predict one or more parameters of the current point based on the reference point.

Clause 30B. The device of clause 29B, wherein the reference frame is a motion compensated reference frame.

Clause 31B. The device of clause 29B, wherein, to predict the one or more parameters, the one or more processors are configured to: predict one or more of an azimuth, a laser identifier, and a radius of the current point.

Clause 32B. The device of clause 29B, wherein, to determine the reference point, the one or more processors are configured to: determine, in the current frame, a pivot point that precedes the current point in a coding order; and determine, based on one or more parameters of the pivot point, the reference point.

Clause 33B. The device of clause 32B, wherein, to determine the reference point based on the one or more parameters of the pivot point, the one or more processors are configured to: determine, in the reference frame, a reference pivot point based on an azimuth of the pivot point; and determine the reference point based on the reference pivot point.

Clause 34B. The device of clause 33B, wherein, to determine the reference pivot point, the one or more processors are configured to determine the reference pivot point based on a laser identifier of the pivot point.

Clause 35B. The device of clause 33B, wherein the reference pivot point is a virtual point in the reference frame.

Clause 36B. The device of clause 33B, wherein, to determine the reference pivot point based on the azimuth of the pivot point, the one or more processors are configured to: determine the reference pivot point based on a scaled azimuth of the pivot point.

Clause 37B. The device of clause 36B, wherein the one or more processors are further configured to: code a syntax element that specifies a log base 2 value of a scaling factor; and determine the scaled azimuth of the pivot point based on the scaling factor.

Clause 38B. The device of clause 33B, wherein, to determine the reference point based on the reference pivot point, the one or more processors are configured to: identify, as the reference point in the reference frame, a point having an azimuth that is greater than an azimuth of the reference pivot point.

Clause 39B. The device of clause 38B, wherein, to identify the point in the reference frame having the azimuth that is greater than the azimuth of the reference pivot point, the one or more processors are configured to: identify, as the reference point in the reference frame, a point having an azimuth that is greater than a scaled azimuth of the reference pivot point.

Clause 40B. The device of clause 39B, wherein, to identify the point having the scaled azimuth that is greater than the scaled azimuth of the reference pivot point, the one or more processors are configured to: identify, as the point, a point having a smallest scaled azimuth that is larger than the scaled azimuth of the reference pivot point.

Clause 41B. The device of clause 39B, wherein, to identify the point having the scaled azimuth that is greater than the scaled azimuth of the reference pivot point, the one or more processors are configured to: identify, as the point, a point having a second smallest scaled azimuth that is larger than the scaled azimuth of the reference pivot point.

Clause 42B. The device of clause 33B, wherein, to determine the reference point, the one or more processors are configured to: determine, in the reference frame and based on the reference pivot point, a plurality of reference points, wherein, to predict the one or more parameters of the current point based on the reference point, the one or more processors are configured to predict the one or more parameters of the current point based on the plurality of reference points.

Clause 43B. The device of clause 29B, wherein the identified reference point comprises a zero-motion candidate.

Clause 44B. The device of clause 25B, wherein the one or more processors are further configured to: code, via a bitstream, a third syntax element indicating an inter prediction mode for the current point, wherein, to predict the current point of the point cloud using inter prediction, the one or more processors are configured to predict the current point using the inter prediction mode.

Clause 45B. The device of clause 25B, wherein, to select the prediction mode, the one or more processors are configured to: code, via a bitstream, an inter prediction syntax element indicating whether the current point is coded using inter prediction; and select, when the inter prediction syntax element indicates that the current point is coded using inter prediction, the inter prediction mode as the prediction mode for the current point, wherein the one or more processors are further configured to: select a context for context adaptive binary arithmetic coding (CABAC) one or more syntax elements based on a value of the inter prediction syntax element.

Clause 46B. The device of clause 45B, wherein the one or more syntax elements comprise one or more of: one or more syntax elements that represent a phi multiplier; and one or more syntax elements that represent primary residual data.

Clause 47B. The device of clause 45B, the one or more processors are further configured to: select a context for CABAC coding the inter prediction syntax element based on values of inter prediction syntax elements for N previous points of the point cloud.

Clause 48B. The device of clause 47B, wherein N is 5.

Clause 49B. The device of clause 25B, further comprising: a spinning LIDAR sensor, wherein the one or more processors are configured to generate the point cloud based on data generated by the spinning LIDAR sensor.

Clause 50B. The device of clause 25B, wherein the device is a vehicle that includes the spinning LIDAR sensor.

Clause 51B. The device of clause 25B, wherein the device is a wireless communication device.

Clause 52B. A computer-readable storage medium storing instructions that, when executed by one or more processors, cause the one or more processors to: responsive to determining to predict a current point in the point cloud using predictive geometry coding, select, from a set of prediction modes, a prediction mode for the current point, wherein the set of prediction modes includes at least an intra prediction mode and an inter prediction mode; and responsive to selecting the inter prediction mode for the current point, predict the current point of the point cloud using inter prediction.

Clause 1C. A method of processing a point cloud, the method comprising: responsive to determining to predict a current point in the point cloud using predictive geometry coding, selecting, from a set of prediction modes, a prediction mode for the current point, wherein the set of prediction modes includes at least an intra prediction mode and an inter prediction mode; and responsive to selecting the inter prediction mode for the current point, predicting the current point of the point cloud using inter prediction.

Clause 2C. The method of clause 1C, wherein selecting the prediction mode comprises: coding, via a bitstream, a first syntax element indicating whether the current point is coded using inter prediction; and responsive to the first syntax element indicating that the current point is coded using inter prediction, selecting the inter prediction mode as the prediction mode for the current point.

Clause 3C. The method of clause 2C, further comprising: coding, via the bitstream, a second syntax element indicating whether inter prediction is enabled, wherein coding the first syntax element comprises coding the first syntax element responsive to the second syntax element indicating that inter prediction is enabled.

Clause 4C. The method of clause 3C, wherein the second syntax element indicates whether inter prediction is enabled for a particular frame that includes the current point.

Clause 5C. The method of any of clauses 1B-4C, wherein the current point is in a current frame, and wherein predicting the current point using inter prediction comprises: determining, in a reference frame that is different than the current frame, a reference point; and predicting one or more parameters of the current point based on the reference point.

Clause 6C. The method of clause 5C, wherein the reference frame is a motion compensated reference frame.

Clause 7C. The method of clause 5C or 6C, wherein predicting the one or more parameters comprises: predicting one or more of an azimuth, a laser identifier, and a radius of the current point.

Clause 8C. The method of any of clauses 5C-7C, wherein determining the reference point comprises: determining, in the current frame, a pivot point that precedes the current point in a coding order; and determining, based on one or more parameters of the pivot point, the reference point.

Clause 9C. The method of clause 8C, wherein determining the reference point based on the one or more parameters of the pivot point comprises: determining, in the reference frame, a reference pivot point based on an azimuth of the pivot point; and determining the reference point based on the reference pivot point.

Clause 10C. The method of clause 9C, wherein determining the reference pivot point further comprises determining the reference pivot point based on a laser identifier of the pivot point.

Clause 11C. The method of clause 9C or 10C, wherein the reference pivot point is a virtual point in the reference frame.

Clause 12C. The method of clause 9B, wherein determining the reference pivot point based on the azimuth of the pivot point comprises: determining the reference pivot point based on a scaled azimuth of the pivot point.

Clause 13C. The method of clause 12C, further comprising: coding a syntax element that specifies a log base 2 value of a scaling factor; and determining the scaled azimuth of the pivot point based on the scaling factor.

Clause 14C. The method of any of clauses 9C-13C, wherein determining the reference point based on the reference pivot point comprises: identifying, as the reference point in the reference frame, a point having an azimuth that is greater than an azimuth of the reference pivot point.

Clause 15C. The method of clause 14C, wherein identifying the point in the reference frame having the azimuth that is greater than the azimuth of the reference pivot point comprises: identifying, as the reference point in the reference frame, a point having a scaled azimuth that is greater than a scaled azimuth of the reference pivot point.

Clause 16C. The method of clause 15C, wherein identifying the point having the scaled azimuth that is greater than the scaled azimuth of the reference pivot point comprises: identifying, as the point, a point having a smallest scaled azimuth that is larger than the scaled azimuth of the reference pivot point.

Clause 17C. The method of clause 15C, wherein identifying the point having the scaled azimuth that is greater than the scaled azimuth of the reference pivot point comprises: identifying, as the point, a point having a second smallest scaled azimuth that is larger than the scaled azimuth of the reference pivot point.

Clause 18C. The method of any of clauses 9C-17C, wherein determining the reference point comprises: determining, in the reference frame and based on the reference pivot point, a plurality of reference points, wherein predicting the one or more parameters of the current point based on the reference point comprises predicting the one or more parameters of the current point based on the plurality of reference points.

Clause 19C. The method of any of clauses 5C-18C, wherein the identified reference point comprises a zero-motion candidate.

Clause 20C. The method of any of clauses 1C-19C, further comprising: coding, via a bitstream, a third syntax element indicating an inter prediction mode for the current point, wherein predicting the current point of the point cloud using inter prediction comprises predicting the current point using the inter prediction mode.

Clause 21C. The method of any of clauses 1C-20C, wherein selecting the prediction mode comprises: coding, via a bitstream, an inter prediction syntax element indicating whether the current point is coded using inter prediction; and selecting, when the inter prediction syntax element indicates that the current point is coded using inter prediction, the inter prediction mode as the prediction mode for the current point, the method further comprising: selecting a context for context adaptive binary arithmetic coding (CABAC) one or more syntax elements based on a value of the inter prediction syntax element.

Clause 22C. The method of clause 21C, wherein the one or more syntax elements comprise one or more of: one or more syntax elements that represent a phi multiplier; and one or more syntax elements that represent primary residual data.

Clause 23C. The method of clause 21C or 22C, further comprising: selecting a context for CABAC coding the inter prediction syntax element based on values of inter prediction syntax elements for N previous points of the point cloud.

Clause 24C. The method of clause 23C, wherein N is 5.

Clause 25C. A device for processing a point cloud, the device comprising: a memory configured to store at least a portion of the point cloud; and one or more processors implemented in circuitry and configured to: responsive to determining to predict a current point in the point cloud using predictive geometry coding, select, from a set of prediction modes, a prediction mode for the current point, wherein the set of prediction modes includes at least an intra prediction mode and an inter prediction mode; and responsive to selecting the inter prediction mode for the current point, predict, the current point of the point cloud using inter prediction.

Clause 26C. The device of clause 25C, wherein, to select the prediction mode, the one or more processors are configured to: code, via a bitstream, a first syntax element indicating whether the current point is coded using inter prediction; and select, responsive to the first syntax element indicating that the current point is coded using inter prediction, the inter prediction mode as the prediction mode for the current point.

Clause 27C. The device of clause 26C, wherein the one or more processors are further configured to: code, via the bitstream, a second syntax element indicating whether inter prediction is enabled, wherein, to code the first syntax element, the one or more processors are configured to code the first syntax element responsive to the second syntax element indicating that inter prediction is enabled.

Clause 28C. The device of clause 27C, wherein the second syntax element indicates whether inter prediction is enabled for a particular frame that includes the current point.

Clause 29C. The device of any of clauses 25C-28C, wherein the current point is in a current frame, and wherein, to predict the current point using inter prediction, the one or more processors are configured to: determine, in a reference frame that is different than the current frame, a reference point; and predict one or more parameters of the current point based on the reference point.

Clause 30C. The device of clause 29C, wherein the reference frame is a motion compensated reference frame.

Clause 31C. The device of clause 29C or 30C, wherein, to predict the one or more parameters, the one or more processors are configured to: predict one or more of an azimuth, a laser identifier, and a radius of the current point.

Clause 32C. The device of any of clauses 29C-31C, wherein, to determine the reference point, the one or more processors are configured to: determine, in the current frame, a pivot point that precedes the current point in a coding order; and determine, based on one or more parameters of the pivot point, the reference point.

Clause 33C. The device of clause 32C, wherein, to determine the reference point based on the one or more parameters of the pivot point, the one or more processors are configured to: determine, in the reference frame, a reference pivot point based on an azimuth of the pivot point; and determine the reference point based on the reference pivot point.

Clause 34C. The device of clause 33C, wherein, to determine the reference pivot point, the one or more processors are configured to determine the reference pivot point based on a laser identifier of the pivot point.

Clause 35C. The device of clause 33C or 34C, wherein the reference pivot point is a virtual point in the reference frame.

Clause 36C. The device of any of clauses 33C-35C, wherein, to determine the reference pivot point based on the azimuth of the pivot point, the one or more processors are configured to: determine the reference pivot point based on a scaled azimuth of the pivot point.

Clause 37C. The device of clause 36C, wherein the one or more processors are further configured to: code a syntax element that specifies a log base 2 value of a scaling factor; and determine the scaled azimuth of the pivot point based on the scaling factor.

Clause 38C. The device of any of clauses 33C-37C, wherein, to determine the reference point based on the reference pivot point, the one or more processors are configured to: identify, as the reference point in the reference frame, a point having an azimuth that is greater than an azimuth of the reference pivot point.

Clause 39C. The device of clause 38C, wherein, to identify the point in the reference frame having the azimuth that is greater than the azimuth of the reference pivot point, the one or more processors are configured to: identify, as the reference point in the reference frame, a point having an azimuth that is greater than a scaled azimuth of the reference pivot point.

Clause 40C. The device of clause 39C, wherein, to identify the point having the scaled azimuth that is greater than the scaled azimuth of the reference pivot point, the one or more processors are configured to: identify, as the point, a point having a smallest scaled azimuth that is larger than the scaled azimuth of the reference pivot point.

Clause 41C. The device of clause 39C, wherein, to identify the point having the scaled azimuth that is greater than the scaled azimuth of the reference pivot point, the one or more processors are configured to: identify, as the point, a point having a second smallest scaled azimuth that is larger than the scaled azimuth of the reference pivot point.

Clause 42C. The device of any of clauses 33C-41C, wherein, to determine the reference point, the one or more processors are configured to: determine, in the reference frame and based on the reference pivot point, a plurality of reference points, wherein, to predict the one or more parameters of the current point based on the reference point, the one or more processors are configured to predict the one or more parameters of the current point based on the plurality of reference points.

Clause 43C. The device of any of clauses 29C-42C, wherein the identified reference point comprises a zero-motion candidate.

Clause 44C. The device of any of clauses 25C-43C, wherein the one or more processors are further configured to: code, via a bitstream, a third syntax element indicating an inter prediction mode for the current point, wherein, to predict the current point of the point cloud using inter prediction, the one or more processors are configured to predict the current point using the inter prediction mode.

Clause 45C. The device of any of clauses 25C-44C, wherein, to select the prediction mode, the one or more processors are configured to: code, via a bitstream, an inter prediction syntax element indicating whether the current point is coded using inter prediction; and select, when the inter prediction syntax element indicates that the current point is coded using inter prediction, the inter prediction mode as the prediction mode for the current point, wherein the one or more processors are further configured to: select a context for context adaptive binary arithmetic coding (CABAC) one or more syntax elements based on a value of the inter prediction syntax element.

Clause 46C. The device of clause 45C, wherein the one or more syntax elements comprise one or more of: one or more syntax elements that represent a phi multiplier; and one or more syntax elements that represent primary residual data.

Clause 47C. The device of clause 45C or 46C, the one or more processors are further configured to: select a context for CABAC coding the inter prediction syntax element based on values of inter prediction syntax elements for N previous points of the point cloud.

Clause 48C. The device of clause 47C, wherein N is 5.

Clause 49C. The device of any of clauses 25C-48C, further comprising: a spinning LIDAR sensor, wherein the one or more processors are configured to generate the point cloud based on data generated by the spinning LIDAR sensor.

Clause 50C. The device of any of clauses 25C-49C, wherein the device is a vehicle that includes the spinning LIDAR sensor.

Clause 51C. The device of any of clauses 25C-49C, wherein the device is a wireless communication device.

Clause 52C. A computer-readable storage medium storing instructions that, when executed by one or more processors, cause the one or more processors to: responsive to determining to predict a current point in the point cloud using predictive geometry coding, select, from a set of prediction modes, a prediction mode for the current point, wherein the set of prediction modes includes at least an intra prediction mode and an inter prediction mode; and responsive to selecting the inter prediction mode for the current point, predict the current point of the point cloud using inter prediction.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing a point cloud, the method comprising:
    selecting, from a set of prediction modes, a prediction mode for a current point, wherein the set of prediction modes includes at least an intra prediction mode and an inter prediction mode, and selecting the prediction mode comprises:
        coding, via a bitstream, a first syntax element indicating that the current point is coded using inter prediction; and selecting the inter prediction mode as the prediction mode for the current point; and predicting the current point of the point cloud using the inter prediction mode.

2. The method of claim 1, further comprising:

coding, via the bitstream, a second syntax element indicating whether inter prediction is enabled, wherein coding the first syntax element comprises coding the first syntax element responsive to the second syntax element indicating that inter prediction is enabled.

3. The method of claim 2, wherein the second syntax element indicates whether inter prediction is enabled for a particular frame that includes the current point.

4. The method of claim 1, wherein the current point is in a current frame, and wherein predicting the current point using inter prediction comprises:

determining, in a reference frame that is different than the current frame, a reference point; and predicting one or more parameters of the current point based on the reference point.

5. The method of claim 4, wherein the reference frame is a motion compensated reference frame.

6. The method of claim 4, wherein predicting the one or more parameters comprises:

predicting one or more of an azimuth, a laser identifier, and a radius of the current point.

7. The method of claim 4, wherein determining the reference point comprises:

determining, in the current frame, a pivot point that precedes the current point in a coding order; and determining, based on one or more parameters of the pivot point, the reference point.

8. The method of claim 7, wherein determining the reference point based on the one or more parameters of the pivot point comprises:

determining, in the reference frame, a reference pivot point based on an azimuth of the pivot point; and determining the reference point based on the reference pivot point.

9. The method of claim 8, wherein determining the reference pivot point further comprises determining the reference pivot point based on a laser identifier of the pivot point.

10. The method of claim 8, wherein the reference pivot point is a virtual point in the reference frame.

11. The method of claim 8, wherein determining the reference pivot point based on the azimuth of the pivot point comprises:

determining the reference pivot point based on a scaled azimuth of the pivot point.

12. The method of claim 11, further comprising:

coding a syntax element that specifies a log base 2 value of a scaling factor; and determining the scaled azimuth of the pivot point based on the scaling factor.

13. The method of claim 8, wherein determining the reference point based on the reference pivot point comprises:

identifying, as the reference point in the reference frame, a point having an azimuth that is greater than an azimuth of the reference pivot point.

14. The method of claim 13, wherein identifying the point in the reference frame having the azimuth that is greater than the azimuth of the reference pivot point comprises:

identifying, as the reference point in the reference frame, a point having a scaled azimuth that is greater than a scaled azimuth of the reference pivot point.

15. The method of claim 14, wherein identifying the point having the scaled azimuth that is greater than the scaled azimuth of the reference pivot point comprises:

identifying, as the point, a point having a smallest scaled azimuth that is larger than the scaled azimuth of the reference pivot point.

16. The method of claim 14, wherein identifying the point having the scaled azimuth that is greater than the scaled azimuth of the reference pivot point comprises:

identifying, as the point, a point having a second smallest scaled azimuth that is larger than the scaled azimuth of the reference pivot point.

17. The method of claim 8, wherein determining the reference point comprises:

determining, in the reference frame and based on the reference pivot point, a plurality of reference points, wherein predicting the one or more parameters of the current point based on the reference point comprises predicting the one or more parameters of the current point based on the plurality of reference points.

18. The method of claim 4, wherein the identified reference point comprises a zero-motion candidate.

19. The method of claim 1, further comprising:

coding, via a bitstream, a third syntax element indicating the inter prediction mode for the current point.

20. The method of claim 1, further comprising selecting a context for context adaptive binary arithmetic coding (CABAC) one or more syntax elements based on a value of the first syntax element.

21. The method of claim 20, wherein the one or more syntax elements comprise one or more of:

one or more syntax elements that represent a phi multiplier; and one or more syntax elements that represent primary residual data.

22. The method of claim 20, further comprising:

selecting a context for CABAC coding the first syntax element based on values of inter prediction syntax elements for N previous points of the point cloud.

23. The method of claim 22, wherein N is 5.

24. A device for processing a point cloud, the device comprising:

a memory configured to store at least a portion of the point cloud; and one or more processors implemented in circuitry and configured to:

select, from a set of prediction modes, a prediction mode for a current point, wherein the set of prediction modes includes at least an intra prediction mode and an inter prediction mode, and to select the prediction mode, the one or more processors are further configured to:

code, via a bitstream, a first syntax element indicating that the current point is coded using inter prediction; and select the inter prediction mode as the prediction mode for the current point; and predict, the current point of the point cloud using the inter prediction mode.

25. The device of claim 24, wherein the one or more processors are further configured to:

code, via the bitstream, a second syntax element indicating whether inter prediction is enabled, wherein, to code the first syntax element, the one or more processors are configured to code the first syntax element responsive to the second syntax element indicating that inter prediction is enabled.

26. The device of claim 25, wherein the second syntax element indicates whether inter prediction is enabled for a particular frame that includes the current point.

27. The device of claim 24, wherein the current point is in a current frame, and wherein, to predict the current point using inter prediction, the one or more processors are configured to:
determine, in a reference frame that is different than the current frame, a reference point; and
predict one or more parameters of the current point based on the reference point.

28. The device of claim 27, wherein the reference frame is a motion compensated reference frame.

29. The device of claim 27, wherein, to predict the one or more parameters, the one or more processors are configured to:
predict one or more of an azimuth, a laser identifier, and a radius of the current point.

30. The device of claim 27, wherein, to determine the reference point, the one or more processors are configured to:
determine, in the current frame, a pivot point that precedes the current point in a coding order; and
determine, based on one or more parameters of the pivot point, the reference point.

31. The device of claim 30, wherein, to determine the reference point based on the one or more parameters of the pivot point, the one or more processors are configured to:
determine, in the reference frame, a reference pivot point based on an azimuth of the pivot point; and
determine the reference point based on the reference pivot point.

32. The device of claim 31, wherein, to determine the reference pivot point, the one or more processors are configured to determine the reference pivot point based on a laser identifier of the pivot point.

33. The device of claim 31, wherein the reference pivot point is a virtual point in the reference frame.

34. The device of claim 31, wherein, to determine the reference pivot point based on the azimuth of the pivot point, the one or more processors are configured to:
determine the reference pivot point based on a scaled azimuth of the pivot point.

35. The device of claim 34, wherein the one or more processors are further configured to:
code a syntax element that specifies a log base 2 value of a scaling factor; and
determine the scaled azimuth of the pivot point based on the scaling factor.

36. The device of claim 31, wherein, to determine the reference point based on the reference pivot point, the one or more processors are configured to:
identify, as the reference point in the reference frame, a point having an azimuth that is greater than an azimuth of the reference pivot point.

37. The device of claim 36, wherein, to identify the point in the reference frame having the azimuth that is greater than the azimuth of the reference pivot point, the one or more processors are configured to:
identify, as the reference point in the reference frame, a point having an azimuth that is greater than a scaled azimuth of the reference pivot point.

38. The device of claim 37, wherein, to identify the point having the scaled azimuth that is greater than the scaled azimuth of the reference pivot point, the one or more processors are configured to:
identify, as the point, a point having a smallest scaled azimuth that is larger than the scaled azimuth of the reference pivot point.

39. The device of claim 37, wherein, to identify the point having the scaled azimuth that is greater than the scaled azimuth of the reference pivot point, the one or more processors are configured to:
identify, as the point, a point having a second smallest scaled azimuth that is larger than the scaled azimuth of the reference pivot point.

40. The device of claim 31, wherein, to determine the reference point, the one or more processors are configured to:
determine, in the reference frame and based on the reference pivot point, a plurality of reference points,
wherein, to predict the one or more parameters of the current point based on the reference point, the one or more processors are configured to predict the one or more parameters of the current point based on the plurality of reference points.

41. The device of claim 27, wherein the identified reference point comprises a zero-motion candidate.

42. The device of claim 24, wherein the one or more processors are further configured to:
code, via a bitstream, a third syntax element indicating the inter prediction mode for the current point.

43. The device of claim 24, wherein the one or more processors are further configured to:
select a context for context adaptive binary arithmetic coding (CABAC) one or more syntax elements based on a value of the first syntax element.

44. The device of claim 43, wherein the one or more syntax elements comprise one or more of:
one or more syntax elements that represent a phi multiplier; and
one or more syntax elements that represent primary residual data.

45. The device of claim 43, the one or more processors are further configured to:
select a context for CABAC coding the first syntax element based on values of inter prediction syntax elements for N previous points of the point cloud.

46. The device of claim 45, wherein N is 5.

47. The device of claim 24, further comprising:
a spinning LIDAR sensor, wherein the one or more processors are configured to generate the point cloud based on data generated by the spinning LIDAR sensor.

48. The device of claim 47, wherein the device is a vehicle that includes the spinning LIDAR sensor.

49. The device of claim 24, wherein the device is a wireless communication device.

50. A non-transitory computer-readable storage medium storing instructions that, when executed by one or more processors, cause the one or more processors to:
select, from a set of prediction modes, a prediction mode for a current point, wherein the set of prediction modes includes at least an intra prediction mode and an inter prediction mode and to select the prediction mode, the instructions further cause the one or more processors to:
code, via a bitstream, a first syntax element indicating that the current point is coded using inter prediction; and
select the inter prediction mode as the prediction mode for the current point; and predict the current point of the point cloud using the inter prediction mode.

\* \* \* \* \*